(12) United States Patent
Okoye et al.

(10) Patent No.: US 8,486,551 B2
(45) Date of Patent: Jul. 16, 2013

(54) FUEL CELL UNIT, FUEL CELL UNIT ARRAY, FUEL CELL MODULE AND FUEL CELL SYSTEM

(75) Inventors: Kenneth Ejike Okoye, Kusatsu (JP); Emenike Chinedozi Ejiogu, Kyoto (JP); Sachio Matsui, Otsu (JP)

(73) Assignee: Micro Silitron Inc., Kusatsu-shi (JP)

(*) Notice: Subject to any disclaimer, the term of this patent is extended or adjusted under 35 U.S.C. 154(b) by 1297 days.

(21) Appl. No.: 11/992,585

(22) PCT Filed: Sep. 29, 2006

(86) PCT No.: PCT/JP2006/319502
§ 371 (c)(1),
(2), (4) Date: Jun. 24, 2008

(87) PCT Pub. No.: WO2007/037392
PCT Pub. Date: Apr. 5, 2007

(65) Prior Publication Data
US 2009/0258276 A1    Oct. 15, 2009

(30) Foreign Application Priority Data

Sep. 29, 2005  (JP) .................................. 2005-283761

(51) Int. Cl.
*H01M 6/30*  (2006.01)
*H01M 8/24*  (2006.01)
*H01M 8/08*  (2006.01)

(52) U.S. Cl.
USPC ............ 429/111; 429/452; 429/498; 429/532

(58) Field of Classification Search
USPC .......................................... 429/111, 498, 532
See application file for complete search history.

(56) References Cited

U.S. PATENT DOCUMENTS 4,240,882 A * 12/1980 Ang et al. ..................... 205/340
4,883,724 A * 11/1989 Yamamoto ..................... 429/431
(Continued)

FOREIGN PATENT DOCUMENTS

| JP | A-2003-187823 | 7/2003 |
| JP | A-2004-199877 | 7/2004 |
| JP | A-2004-319250 | 11/2004 |

(Continued)

OTHER PUBLICATIONS

PCT International Search Report mailed on Nov. 21, 2006 for the corresponding International patent application No. PCT/JP2006/319502 (copy enclosed).

*Primary Examiner* — Barbara Gilliam
*Assistant Examiner* — Robert S. Carrico
(74) *Attorney, Agent, or Firm* — Posz Law Group, PLC

(57) ABSTRACT

The present invention provides a fuel cell unit, fuel cell unit array, fuel cell module and fuel cell system that can achieve a reduction in size and costs. The fuel cell unit of the present invention has a PIN structure comprising a fuel electrode (11) formed of a p-type semiconductor, an oxygen electrode (13) formed of an n-type semiconductor, and an interlayer (12) formed of an intrinsic semiconductor lying between the fuel electrode (11) and the oxygen electrode (13); wherein
  the fuel electrode (11) and the oxygen electrode (13) are porous and have fluid permeability;
  a metal-based catalyst layer is formed on the inner surfaces of pores in the porous portion;
  the interlayer (12) is porous so that hydrogen ions generated at the fuel electrode (11) can pass therethrough, but electrons are blocked;
  hydrogen-containing fuel is supplied to the surface of the fuel electrode (11) and an oxygen-containing oxidizing fluid is supplied to the surface of the oxygen electrode (13); and
  connecting terminals each electrically connected to the fuel electrode (11) and the oxygen electrode (13).

7 Claims, 11 Drawing Sheets

U.S. PATENT DOCUMENTS

| | | |
|---|---|---|
| 5,599,638 A | 2/1997 | Surampudi et al. |
| 5,919,583 A | 7/1999 | Grot et al. |
| 6,416,898 B1 * | 7/2002 | Ohzu et al. ............... 429/492 |
| 6,641,948 B1 * | 11/2003 | Ohlsen et al. ............. 429/480 |
| 2004/0086762 A1 * | 5/2004 | Maeda et al. ............... 429/32 |
| 2004/0197613 A1 * | 10/2004 | Curlier et al. .............. 429/14 |
| 2006/0196535 A1 * | 9/2006 | Swanson et al. ........... 136/244 |
| 2006/0246342 A1 * | 11/2006 | MacPhee ..................... 429/40 |
| 2007/0259227 A1 * | 11/2007 | Oishi et al. ................. 429/19 |
| 2008/0210950 A1 * | 9/2008 | Sung ............................. 257/77 |

FOREIGN PATENT DOCUMENTS

| | | |
|---|---|---|
| WO | WO 02/058219 | 7/2002 |

* cited by examiner

FUEL CELL UNIT, FUEL CELL UNIT ARRAY, FUEL CELL MODULE AND FUEL CELL SYSTEM

FIELD

The present invention relates to a fuel cell unit having a pin or pn structure, a fuel cell module and a fuel cell system. Specifically, the present invention relates to a fuel cell unit, fuel cell unit array, fuel cell module, and fuel cell system that are suitably used in a small-sized fuel cell, wherein the catalytic action of platinum, ruthenium and like metal-based catalysts or oxide-based catalysts can be effectively achieved.

BACKGROUND ART

A fuel gas is usually used as a fuel in a fuel cell. Specifically, hydrogen gas, methane gas and like hydrogen-containing gases, or methanol and like liquids are reacted with oxygen in the air to generate electric energy. Most of the waste product generated in this process is water; only a small amount of carbon dioxide, carbon monoxide and like toxic waste is generated. This method has therefore attracted public attention in recent years as an environmentally friendly energy-generation technique. Unlike engines and turbines, fuel cells are quiet and highly efficient, and intensive research and development has been conducted to find the practical uses thereof as a promising energy-generation technique. In some fuel cells, methanol and like liquid fuels may be used instead of a fuel gas, and a liquid oxidizing agent that contains hydrogen peroxide or the like may be used instead of air and like oxidation gases.

Fuel cells are usable in various fields, and practically used in fuel cell-powered vehicles, etc. Possible applications of fuel cells include their use as energy systems in facilities that need a considerable heat source and a large amount of electric power for air conditioning and hot water supply; in energy systems for general households; and as power sources for devices such as PDAs, cellular phones, laptop computers, etc.

FIG. 14 illustrates the principal of fuel cell electric power generation, schematically showing the principal structure and electrochemical reaction of the unit cell. FIG. 14 illustrates an example wherein methanol is used as a fuel. As shown in FIG. 14, in the fuel cell, a fuel electrode (anode) 101 and an oxygen electrode (cathode) 103 are disposed to face each other, and an electrolyte layer 102 lies between the fuel electrode 101 and the oxygen electrode 103.

As shown in Formula (1) below, the supplied methanol ($CH_3OH$) reacts with water ($H_2O$) on the fuel electrode 101 side so that hydrogen ions ($H^+$) and electrons ($e^-$) are dissociated therefrom and carbon dioxide ($CO_2$) is generated.

$$CH_3OH + H_2O \rightarrow 6H^+ + 6e^- + CO_2 \quad (1)$$

Hydrogen ions can migrate through the electrolyte layer 102, but electrons cannot. Therefore, while hydrogen ions diffuse through the electrolyte layer 102 and migrate to the oxygen electrode 103, electrons move toward the oxygen electrode 103 via a circuit 104 that connects the fuel electrode 101 with the oxygen electrode 103 outside.

On the oxygen electrode 103, supplied oxygen gas ($O_2$) reacts with the hydrogen ions that have migrated through the electrolyte layer, and the electrons that have traveled from the fuel electrode react as shown in Formula (2) below to generate water ($H_2O$).

$$6H^+ + 6e^- + 3/2 O_2 \rightarrow 3H_2O \quad (2)$$

When methanol and oxygen gas are continuously supplied, the reactions shown in Formulae (1) and (2) occur continuously, so that electrons continuously flow in the circuit 104. In other words, by supplying fuel fluid ($CH_3OH$, $H_2$, etc.) and oxidizing fluid ($O_2$ or the like) in a continuous manner to the unit cell shown in FIG. 14, electric current flowing from the oxygen electrode 103 to the fuel electrode 101, i.e., electric power, can be generated.

There are several types of fuel cells, including molten carbonate fuel cells, solid polymer fuel cells, phosphoric acid fuel cells, solid oxide fuel cells, alkaline fuel cells and the like, depending on the types of the electrolytes used. Among these, the operational temperature in molten carbonate fuel cells and solid oxide fuel cells is relatively high, about 600-700° C. and about 800-1,000° C., respectively. The operation temperature in other types of fuel cells is generally not higher than about 200° C.

In fuel cells operating at a high temperature (high-temperature fuel cells), the reaction of Formula (1) proceeds at the fuel electrode using heat energy. Increasing the efficiency of the above-mentioned reactions at the fuel electrode and oxygen electrode—in other words, increasing the speed of the reaction at each electrode—is an important object for fuel cells operating at a low temperature (low-temperature fuel cells). In order to accelerate the reactions of Formulae (1) and (2), a catalyst, usually platinum, is used in the fuel electrode 101 and oxygen electrode 103. Therefore, platinum plays a very important role in low-temperature fuel cells.

Examples of usable catalysts other than platinum include iridium, palladium, rhodium, ruthenium, and alloys of at least two of the aforementioned metals other than platinum; alloys of platinum and the aforementioned metals; titanium oxides, etc. However, because platinum is superior to the other catalysts, it is the most widely used catalyst for fuel cells.

Porous carbon electrodes are often used in fuel cells to allow fuel fluid or oxygen-containing fluid to pass through the fuel electrode 101 and the oxygen electrode 103, and accelerate the reactions of Formula (1) or Formula (2) at these electrodes. Furthermore, in low-temperature fuel cells, fine powders of catalysts such as platinum, etc., are supported on the inner surfaces of pores in the porous electrode. As described above, in order to accelerate the reactions of Formula (1) and Formula (2), catalysts, in particular platinum, which has an excellent effect, are essential.

However, platinum is a very expensive noble metal; this is one of the main reasons why fuel cells are expensive. Platinum easily bonds to CO gas, and therefore CO poisoning may occur due to CO gas in the fuel fluid, CO gas generated by the oxidation reaction at the fuel electrode, etc. When platinum is poisoned by CO, its catalytic ability greatly decreases.

Methanol, hydrogen gas, and methane gas are often used in fuel cells. Methanol, hydrogen gas and methane gas—in particular hydrogen gas and methane gas—usually contain a small amount of CO gas, because they are obtained using hydrocarbons of natural gas as a raw material. In fuel cells that use methanol, CO is formed during the oxidation of the methanol. This transitive variety of CO is highly stable as it is adsorbed on the surface of platinum, etc. Therefore, when platinum is used as a catalyst and methanol, hydrogen gas or the like is used as a fuel, CO poisoning of the platinum is inevitable. It is possible to use catalysts other than platinum, but such catalysts are inferior to platinum in their catalytic effects, resulting in slower reactions at the fuel electrode and oxygen electrode.

It is believed that by adding ruthenium or the like to platinum in a methanol fuel cell, CO poisoning of platinum can be prevented to some degree. This is because ruthenium apparently accelerates the oxidation of $H_2O$ so as to generate hydroxyl ions and oxidize CO to $CO_2$. However, because it is still impossible to satisfactorily maintain the catalytic effects of platinum, the problem of CO-poisoned platinum has yet to be practically resolved.

Therefore, when platinum is used as a catalyst and methanol or hydrogen gas is used as a fuel fluid, the CO poisoning of platinum is unavoidable. However, catalysts other than platinum are inferior to platinum in their catalytic effects. Therefore, in the currently available fuel cell units, the reactions at the fuel electrode and the oxygen electrode are slow.

In order to solve the above-mentioned problem, fuel cells that do not use platinum as a catalyst have been proposed (for example, Patent Document 1). The fuel cell disclosed in Patent Document 1 comprises a fuel electrode, an oxygen electrode and an electrolyte layer lying between the fuel electrode and the oxygen electrode, wherein the fuel electrode is an III-IV compound semiconductor doped with p-type impurities. In this fuel cell, a reaction takes place wherein hydrogen gas is decomposed to hydrogen radicals, and the hydrogen radicals are dissociated into hydrogen ions and electrons at the fuel electrode. It is assumed that because this reaction proceeds smoothly, platinum is unnecessary. In other words, a p-type impurity-doped compound semiconductor probably functions as a catalyst for dissociating hydrogen gas into hydrogen ions and electrons.

A fuel cell using a semiconductor as its electrode, wherein the structure of a pn junction-type semiconductor is applied (for example, Patent Document 2), has also been proposed. The fuel cell disclosed in Patent Document 2 is a single chamber-type fuel cell, wherein the whole fuel cell is formed in a mixed gas atmosphere of a fuel gas and an oxygen-containing gas. In this respect, the fuel cell of Patent Document 2 is different from the double chamber-type fuel cell disclosed, for example, in Patent Document 1. The fuel cell of Patent Document 2 comprises a p-type semiconductor layer whose carriers are holes, an n-type semiconductor layer whose carriers are electrons, and a pn-mixture layer between the p-type semiconductor layer and the n-type semiconductor layer, wherein all of the layers are porous to such an extent that the mixed gas can pass therethrough.

The electric power generation mechanism of this fuel cell is probably as follows.

In the vicinity of the depletion layer (the pn junction), which is sandwiched between the p-type semiconductor and the n-type semiconductor, an oxygen gas is adsorbed on the surface of the p-type semiconductor and then polarized. At the same time, a hydrogen gas is adsorbed on the surface of the n-type semiconductor and then polarized. A positive charge is generated on the surface of the p-type semiconductor, and a negative charge is generated on the surface of the n-type semiconductor. In a series of processes, the adsorbed hydrogen ions ($H^+$) and oxygen ions ($O^{2-}$) are reacted, water ($H_2O$) is generated, electrons in the valence band in the p-type semiconductor near the depletion layer (the pn junction) are excited, and holes are formed in the valence band. In the formed electron-hole pairs, electrons migrate to the n-type semiconductor and holes migrate to the p-type semiconductor. By this mechanism, a potential difference is generated between the p-type semiconductor (negative pole) and the n-type semiconductor (positive pole), and the potential difference can be output as electric power.

The fuel cells disclosed in Patent Documents 1 and 2, which use semiconductors, do not employ a catalyst. In order to achieve the reactions shown in Formula (1) and Formula (2) in an efficient manner in the fuel electrode and the oxygen electrode, the use of a catalyst, in particular platinum, is desirable. However, as described above, the amount of reaction in the fuel electrode and the oxygen electrode that can be promoted is an important object. Particularly when platinum is used as the catalyst, the problem of how to prevent the CO poisoning of platinum is important. However, effective means for accelerating the reaction speed and preventing the CO poisoning of platinum, when platinum is used as a catalyst, have yet to be developed. Therefore, there is demand for the further improvement of the catalytic activity of platinum.

Furthermore, known methanol fuel cells have a serious problem, known as "methanol crossover". Methanol crossover is a phenomenon wherein the methanol supplied to the fuel electrode moves to the oxygen electrode after passing through an interlayer such as an electrolyte layer. The reaction at the oxygen electrode caused by the migrated methanol negates the electric power generation effect.

In other words, methanol in conventional fuel cells tends to cross over from the fuel electrode, through the electrolyte and to the oxygen electrode, where it reacts with oxygen and liberates heat without producing electricity, leading to a loss of methanol and a reduction in fuel cell voltage. It has been shown that losses of 100 mV to 140 mV at a given current density occur at the cathode.

Patent Documents 3 and 4 disclose methods for reducing methanol crossover; however, satisfactorily practical effects have not been obtained, and the problem of methanol crossover has therefore not been completely resolved.

Yet another drawback of methanol fuel cells is that, unlike in hydrogen fuel cells, the anode needs to be activated in order to increase its potential. This leads to the need for high catalytic loading at the electrodes to achieve considerable reaction speed. The greater the catalyst amount, the higher the cost of the fuel cell. Therefore, some attempt should be made to reduce the cost.

In conventional fuel cells employing solid polymer electrolytes, the catalyst deposited on the two sides of solid electrolytes is supported by, for example, carbon powders. This leads to an inefficient use of the catalyst. Additionally, the surface area (the two-dimensional surface area) is limited, and this makes it difficult to miniaturize the direct methanol fuel cell for low power application. There is thus a need to establish the efficient utilization of the catalyst by promoting reaction speed, so that the electric power generation efficiency can be increased. One example of such a method requires the increase of the surface area of the electrodes and the reduction of the catalytic loading at the electrodes.

In addition, there is demand for small size fuel cells for use in such devices as cellular phones, laptop computers and PDAs. In order to meet this demand, it is necessary to reduce the size of the electrode by accelerating the reaction speed at the oxygen electrode and the fuel electrode.

However, miniaturization of fuel cells that operate at low temperatures cannot be achieved unless several problems can be solved.

Patent Document 1
Japanese Unexamined Patent Publication No. 2004-319250
Patent Document 2
Japanese Unexamined Patent Publication No. 2004-199877
Patent Document 3
U.S. Pat. No. 5,599,638
Patent Document 4
U.S. Pat. No. 5,919,583

DISCLOSURE OF THE INVENTION

Problem to be Solved by the Invention

This invention aims to solve the fuel cell problems mentioned above. In particular, the invention aims to provide a fuel cell unit, fuel cell unit array, fuel cell module and fuel cell system by which catalytic actions of metal-based catalysts including platinum or oxide-based catalysts can be effectively achieved, CO poisoning of platinum can be reduced, and a reduction in size and costs can be achieved.

Means for Solving the Problem

The fuel cell unit (1) of the present invention that achieves one of the above objectives is provided with a fuel electrode formed of a p-type semiconductor, an oxygen electrode formed of an n-type semiconductor, and an interlayer formed of an intrinsic semiconductor lying between the fuel electrode and the oxygen electrode;

Wherein the fuel electrode is porous and permeable to fuel fluid, a metal-based catalyst layer is formed on the inner surfaces of pores in the porous portion of the fuel electrode, the oxygen electrode is porous and permeable to oxidizing fluid, a metal-based catalyst layer is formed on the inner surfaces of pores in the porous portion of the oxygen electrode, the interlayer is porous and able to hold electrolyte, allowing the hydrogen ions generated at the fuel electrode to pass therethrough, but blocking electrons.

The fuel cell unit is structured so that a hydrogen-containing fuel fluid is supplied to the surface of the fuel electrode, and an oxygen-containing oxidizing fluid is supplied to the surface of the oxygen electrode; and the fuel cell unit is provided with a connecting terminal in each of the fuel electrode and the oxygen electrode, wherein the connecting terminals is electrically connected to each electrode.

The fuel cell unit (2) of the present invention that achieves another objective is provided with a fuel electrode formed of a p-type semiconductor, an oxygen electrode formed of an n-type semiconductor, and an interlayer lying between the fuel electrode and the oxygen electrode, wherein the fuel electrode is porous and permeable to fuel fluid;

a metal-based catalyst layer being formed on the inner surfaces of pores in the porous portion of the fuel electrode, the oxygen electrode is porous and permeable to oxidizing fluid, the interlayer is formed on at least one of the surfaces of the fuel electrode and the oxygen electrode, the interlayer is porous and able to hold electrolyte, allowing the hydrogen ions generated at the fuel electrode to pass therethrough, but blocking electrons, the fuel electrode and the oxygen electrode is joined at the surface where the interlayer was formed, the fuel cell unit is structured so that a hydrogen-containing fuel fluid is supplied to the surface of the fuel electrode, and an oxygen-containing oxidizing fluid is supplied to the surface of the oxygen electrode, and the fuel cell unit is provided with a connecting terminal in each of the fuel electrode and the oxygen electrode, the connecting terminals being electrically connected to each electrode.

The fuel cell unit (3) of the present invention that achieves another objective is provided with a fuel electrode having a pn-junction region in which a fuel fluid supply surface is formed of a p-type semiconductor layer, and another surface is formed of an n-type semiconductor layer, an oxygen electrode having a pn-junction region in which an oxidizing fluid supply surface is formed of an n-type semiconductor layer and another surface is formed of a p-type semiconductor layer, and an electrolyte layer functioning as an interlayer lying between the n-type semiconductor layer of the fuel electrode and the p-type semiconductor layer of the oxygen electrode, wherein the fuel electrode is porous, the p-type semiconductor layer of the fuel electrode is permeable to fuel fluid and thicker than the n-type semiconductor layer, a metal-based catalyst layer is formed on the inner surfaces of pores in the porous portion of the fuel electrode, the n-type semiconductor layer is impermeable to fuel fluid, the oxygen electrode is porous, the n-type semiconductor layer of the oxygen electrode is thicker than the p-type semiconductor layer and permeable to oxidizing fluid, a metal-based catalyst layer is formed on the inner surfaces of pores in the porous portion of the oxygen electrode, the interlayer contains electrolyte and allows the hydrogen ions generated at the fuel electrode to pass therethrough, the fuel cell unit is structured so that a hydrogen-containing fuel fluid is supplied to the surface of the fuel electrode, and an oxygen-containing oxidizing fluid is supplied to the surface of the oxygen electrode, and the fuel cell unit is provided with a connecting terminal in each of the fuel electrode and the oxygen electrode, and the connecting terminals is electrically connected to each electrode.

The fuel cell unit (4) of the present invention is such that, among any one of fuel cell units (1) to (3), wherein at least one of the fuel electrode and the oxygen electrode is optically transparent.

The fuel cell unit (5) of the present invention is such that, among any one of fuel cell units (1) to (3), which is structured so that the electrolyte in the interlayer is irradiated with light.

The fuel cell unit (6) of the present invention is such that, among any one of fuel cell units (1) to (3), which comprises a metal-based electrically conductive layer between the catalyst layer and the inner surfaces of pores of at least one of the fuel electrode and the oxygen electrode.

The fuel cell unit (7) of the present invention is such that, among any one of fuel cell units (1) to (3), wherein the fuel fluid is methanol or hydrogen gas.

The fuel cell unit (8) of the present invention is such that, in either fuel cell units (1) or (2), wherein the diameter of the pores in the porous portion that is permeable to fuel fluid in the fuel electrode and the diameter of the pores in the porous portion that is permeable to oxidizing fluid in the oxygen electrode is in the micrometer range, and the porous portion in the interlayer is in the nanometer range.

The fuel cell unit (9) of the present invention is such that, in the fuel cell unit (3), wherein the diameter of the pores in the p-type semiconductor layer portion in the fuel electrode and the n-type semiconductor layer portion in the oxygen electrode is in the micrometer range; and the diameter of the pores in the n-type semiconductor layer portion in the fuel electrode and the p-type semiconductor layer portion in the oxygen electrode is in the nanometer range.

The fuel cell unit (10) of the present invention is such that, among any one of fuel cell units (1) to (3), wherein the semiconductor material forming the fuel electrode and the oxygen electrode is any one of selected from the group consisting of silicon, germanium and titanium-oxide-containing oxide semiconductors.

The fuel cell unit (11) of the present invention is such that, among any one of fuel cell units (1) to (3), wherein the metal-based catalyst forming the metal-based catalyst layer is any one of selected from the group consisting of platinum, iridium, palladium, rhodium, ruthenium and alloys containing at least two metals thereof, or a titanium oxide.

The fuel cell unit (12) of the present invention is such that, among any one of fuel cell units (1) to (3), wherein the electrolyte is acidic.

The fuel cell unit array (1) of the present invention is characterized in that a plurality of fuel cell units of any one of fuel cell units (1) to (3) are arranged in a flat manner so that they are electrically connected in parallel and/or in series, and electric power generated from the plurality of fuel cell units is collected and then output.

The fuel cell unit array (2) of the present invention is characterized in that a plurality of fuel cell units of any one of fuel cell units (1) to (3) are laminated via the fuel supply means, the oxidizing fluid supply means and a light introduction means; and the plurality of fuel cell units are structured so that they are electrically connected in series, and voltage generated therefrom is added together and then output.

The fuel cell module of the present invention is provided with the fuel cell unit array (1), a fuel feed portion and an oxidizing fluid feed portion, wherein the fuel cell unit array is disposed between the fuel feed portion and the oxidizing fluid feed portion in such a manner that fluid cannot pass between the fuel feed portion and the oxidizing fluid feed portion, the fuel electrode in the fuel cell unit array faces the fuel feed portion, and the oxygen electrode in the fuel cell unit array faces the oxidizing fluid feed portion, the fuel feed portion is provided with a fuel inlet portion and a fluid discharge portion, and the oxidizing fluid feed portion is provided with an oxidizing fluid inlet portion and a fluid and water discharge portion, among the walls surrounding the fuel feed portion, the wall facing the fuel electrode and/or among the walls surrounding the oxidizing fluid feed portion, the wall facing the oxygen electrode is formed of an optically transparent material, and the fuel cell module further includes an output means for outputting electric power generated in and collected from the fuel cell unit array.

The fuel cell system of the present invention is provided with a plurality of the fuel cell modules combined in a united manner, wherein the plurality of fuel cell modules are connected to each other so that electric power output from the output means of each fuel cell module is collected, and the fuel cell system further includes a fuel cell output member for outputting collected electric power, and a DC-DC converter that is electrically connected to the fuel cell output member.

In the present specification, the term "micrometer range" indicates the range approximately from 1 µm to 1 mm, and the term "nanometer range" indicates the range approximately from 1 nm to 1 µm. The term "fuel fluid" indicates methanol, hydrogen gas or like fuels in fluid form. The term "oxidizing fluid" indicates a fluid form oxidizing substance including a solution containing oxygen gas, air, hydrogen peroxide, etc.

Effects of the Invention

The fuel cell units (1)-(12) basically have a pin or pn junction structure, and an electrolyte is disposed between the p-type semiconductor layer and the n-type semiconductor layer. Although photoirradiation is not necessarily required in these fuel cell units, when light is irradiated, catalytic action at the fuel electrode is remarkably enhanced, which can be attributed to the holes formed by the photoelectric effect; additionally, the catalytic action at the oxygen electrode is remarkably enhanced, which can be attributed to the electrons formed by the photoelectric effect. In other words, oxidation at the fuel electrode and reduction at the oxygen electrode are remarkably accelerated. This is because strong oxidation, attributable to the holes, reaching the fuel electrode promotes the oxidation of methanol or like fuel fluids at the fuel electrode, and the photoelectrons reaching the oxygen electrode promote the reduction of the oxidizing fluid at the oxygen electrode. Furthermore, the electric field generated between the electrode and the electrolyte due to the photoelectric effect enhances the double layer effect. Accordingly, the accelerated reaction increases the current density and power density generated.

In a pin or pn structure fuel cell, the regions of the electrode and the electrolyte can be formed in a single silicon substrate. This makes it possible to obtain small, low-cost fuel cells of high energy density.

Therefore, if the electric power generated by the fuel cell unit is the same, the amount of the catalyst used for the fuel electrode and the oxygen electrode can be reduced, reducing the size of the electrode, the fuel cell unit, and desirably the fuel cell as a whole. With this structure, the catalytic action can be more pronounced, therefore allowing the use of inexpensive catalysts. If the size of the fuel cell unit and the amount of the catalyst used are the same, the electric power generated per unit cell can be remarkably increased.

In particular, when platinum is used as the catalyst, even if a small amount of CO gas is present in the fuel fluid, or if CO gas is generated from the fuel fluid, because the fuel electrode has high reaction activity, the CO gas can be easily oxidated to form $CO_2$. Therefore, even when platinum is used as the catalyst, CO poisoning of platinum, which is a serious problem that cannot be solved in general fuel cells, can be overcome.

When a metal-based conductive layer is provided between the inner surfaces of the pores and the catalyst layer in at least one of the fuel electrode and the oxygen electrode, methanol crossover can be nearly prevented, even if methanol is used as the fuel fluid. This reduces the loss of methanol, and increases electric power generation efficiency.

The fuel cell unit has the characteristics described above. By utilizing these characteristics, the fuel cell unit of the present invention can increase output, reduce production costs, achieve a reduction in size, prolong the useful life of the fuel cell, etc.

In the fuel cell unit (1) or (2), the cell unit array is formed from any one of fuel cell units (1) to (3), and therefore a fuel cell unit array having the characteristics of any one of fuel cell units (1) to (3) can be obtained.

In the above-described fuel cell module, because the fuel cell module comprises fuel cell unit array (1), the fuel cell module has the characteristics of any one of fuel cell units (1) to (3) and those of fuel cell unit array (1).

In the above-described fuel cell system, because the fuel cell system is formed from the above-described fuel cell module, a fuel cell system having the characteristics of any one of fuel cell units (1) to (3) or fuel cell unit array (1) and the fuel cell module can be obtained. Furthermore, because the fuel cell system is provided with a DC-DC converter, it can readily generate the output voltage required. The present invention, especially because miniaturized fuel cell systems are available, is suitably usable as a power sources for cellular phones and personal computers.

BEST MODE FOR CARRYING OUT THE INVENTION

Figure 1A:
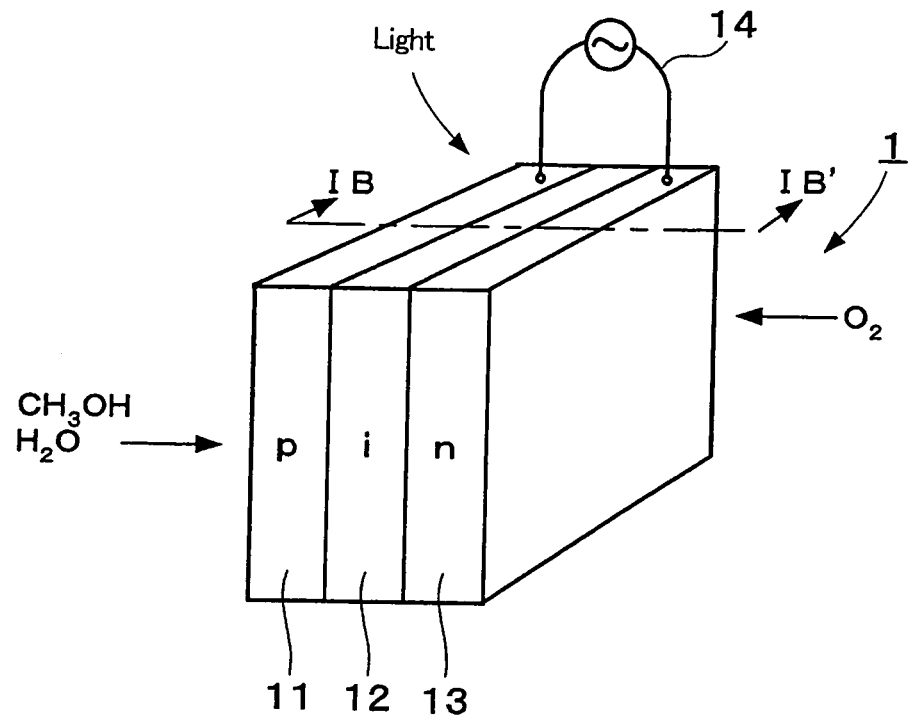
FIG. 1A is a perspective view schematically illustrating the principal structure of the fuel cell unit according to the first Embodiment of the present invention.

The fuel cell unit, fuel cell unit array, fuel cell module, and fuel cell system according to one embodiment of the present invention are explained in detail below with reference to the attached drawings. Note that in the drawings, the same reference numerals are applied to the portions serving the same functions, eliminating overlapping explanations.

Figure 1B:
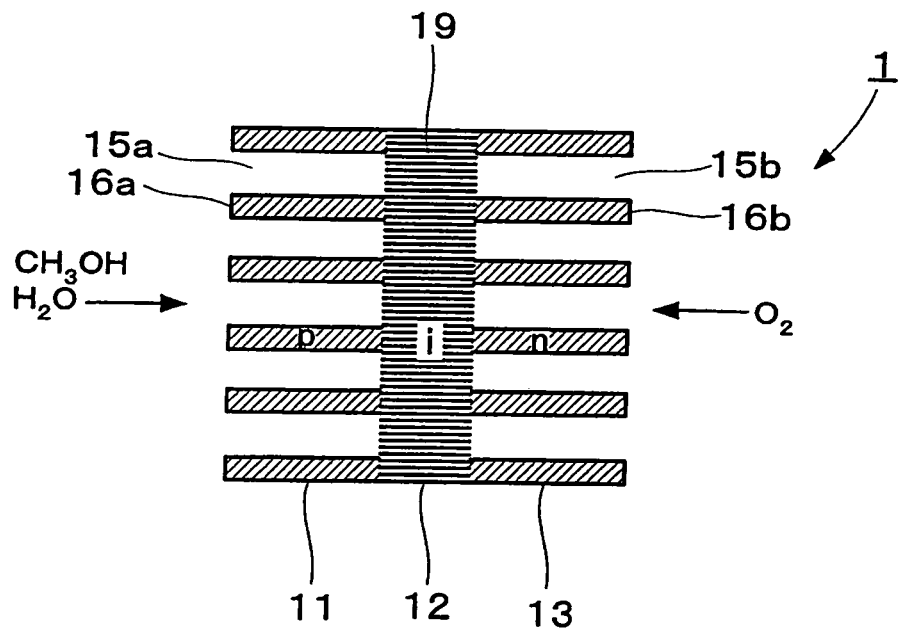
FIG. 1B is an enlarged fragmentary cross-sectional view schematically illustrating the structure of the fuel cell of FIG. 1A taken along the line IB-IB'.

FIG. 1A is a perspective view schematically illustrating the principal structure of the fuel cell unit (hereunder, the term "fuel cell unit" is simply referred to as "cell unit") according to the first embodiment of the present invention. FIG. 1B is an enlarged fragmentary cross-sectional view schematically illustrating the structure of the fuel cell of FIG. 1A taken along the line IB-IB'.

With reference to FIGS. 1A and 1B, the principal structure and operation of the cell unit 1 of the present embodiment are explained below. An embodiment wherein the semiconductor material is porous silicon, the fuel fluid is methanol, and the oxidizing fluid is an oxygen gas, is disclosed as one example.

The cell unit 1 has a pin junction structure comprising three layers: a p-type semiconductor layer, an n-type semiconductor layer, and an i-type semiconductor layer (intrinsic semiconductor layer) that lies between the p-type semiconductor layer and the n-type semiconductor layer. The first layer is a fuel electrode 11 that forms an anode, which is formed from a p-type semiconductor layer to which boron, aluminum and like p-type impurities are doped. The second layer is an interlayer 12, which forms an electrolytic region. The interlayer 12 is formed from an intrinsic semiconductor layer to which impurities are not doped (undoped). The third layer is an oxygen electrode 13, which forms a cathode. The oxygen electrode 13 is formed from an n-type semiconductor layer to which phosphorus, arsenic and like n-type impurities are doped.

It is preferable that all of the fuel electrode 11, interlayer 12, and oxygen electrode 13 be formed of, for example, porous silicon. As shown in FIG. 1B, pores 15a and 15b are formed in the fuel electrode 11, which is a p-type semiconductor layer, and the oxygen electrode 13, which is an n-type semiconductor layer. The pores 15a and 15b are partitioned by walls 16a and 16b, respectively. The fuel electrode 11 and the oxygen electrode 13 permeable to methanol, hydrogen gas and like fuel fluids, oxygen gas, air, hydrogen peroxide solution and like oxidizing fluids. In other words, fuel fluids and oxidizing fluids can permeate the pores 15a and 15b in each layer. The interlayer is also provided with pores 19.

Here, it is preferable that the diameters of pores 15a and 15b in the fuel electrode 11 and the oxygen electrode 13 be larger than the diameter of pore 19 in the interlayer 12. For example, it is preferable that the diameters of pores 15a and 15b be in the micrometer range, for example, not greater than 20 μm and particularly preferably 4 μm to 8 μm. The diameter of pores 19 is preferably in the nanometer range. However, when hydrogen or like gaseous materials are used as the fuel fluid, the diameters of pores 15a and 15b in the fuel electrode 11 and the oxygen electrode 13, and the diameter of pore 19 in the interlayer 12, may be almost the same, i.e., in the nanometer range. In the present specification, the term "diameter" means the inside diameter of the pore; for example, if the pore is square-shaped, rather than circular, "diameter" means the average inside diameter. If several pores having different diameters exist, the term "diameter" means the average diameters of the pores.

The inner surfaces of the pores 15a and 15b in the fuel electrode 11 and the oxygen electrode 13 are covered with a catalyst of platinum, ruthenium or an alloy thereof. It is preferable that a palladium, nickel, tantalum, niobium or like conductive metal layer be provided between the inner surfaces of the pores 15a, 15b and the catalyst layer. It is also preferable that the fuel electrode 11 and/or the oxygen electrode 13 be optically transparent, so that light can reach the interlayer 12 via the fuel electrode 11 or the oxygen electrode 13. If the fuel electrode 11 and the oxygen electrode 13 are not optically transparent, it is preferable that optical fibers and like means be provided so that light can reach the interlayer 12.

Furthermore, the fuel electrode 11 and the oxygen electrode 13 each comprise a connecting terminal (not shown), which corresponds to the portion connected with the outside circuit 14.

The pores 19 in the interlayer 12 are impregnated with an electrolyte, and the electrolyte is held in the pores by static forces due to capillarity action. Examples of preferable electrolytes include sulfuric acid solution ($H_2SO_4$), phosphoric acid solution ($H_3PO_4$), trifluoromethanesulfonic acid solution and like acidic solutions. The electrolytes are not necessarily limited to these acidic solutions, and, for example, may be alkaline solution or water. This is because hydrogen ions can migrate from the fuel electrode 11 to the oxygen electrode 13, regardless of whether the solution held in the interlayer 12 is alkaline solution or water. Therefore, the electrolytes in the present specification include alkaline solutions and water.

The semiconductor materials for the fuel electrode 11, interlayer 12, and oxygen electrode 13 include single crystal silicon, poly-crystal silicon, amorphous silicon and single crystal germanium group IV semiconductors, gallium arsenic, iridium phosphorous, and aluminum-gallium-arsenic group III-IV compound semiconductors, cadmium sulfide, and copper sulfide group II-VI compound semiconductors, titanium oxide, zinc oxide, nickel oxide, tin oxide, iron II oxide, cobalt oxide cobalt, iron III oxide, and copper oxide compound oxide semiconductors. These materials are used to configure the p-type, n-type and intrinsic semiconductors. Among these semiconductor materials, those usable for the fuel electrode 11 and the oxygen electrode 13 are porous and permeable to gases and liquids and like fluids (fluid permeability).

Among the above-mentioned semiconductor materials, a porous material that can form an intrinsic semiconductor layer can be used for the interlayer 12. Examples thereof include silicon, germanium and like materials to which impurities are undoped. The materials for the interlayer 12 should hold an electrolyte or water in the pores by capillary forces.

The p-type semiconductor layer in the fuel electrode 11 and the n-type semiconductor layer in the oxygen electrode 13 are preferably thicker than the interlayer 12. The thickness of the fuel electrode 11 and oxygen electrode 13 is preferably in the micrometer range, particularly from 200 μm to 500 μm. The thickness of the interlayer 12 is preferably not greater than 200 μm, and particularly preferably not greater than 80 μm.

Examples of the usable materials for the catalyst layer covering the inner surfaces of pores in the fuel electrode 11 and the oxygen electrode 13 include, other than platinum, iridium, palladium, rhodium, ruthenium and like noble metals and alloys containing at least two thereof. Titanium oxides may also be used. Among the usable materials, platinum has the best catalytic ability. Covering the walls of the pores in the fuel electrode 11 and the oxygen electrode 13 with a metal-based catalyst can be accomplished by atomic layer deposition, a surface organometallic chemistry method, electroplating, plasma spattering, CVD, etc. Atomic layer deposition and the surface organometallic chemistry method are particularly preferable for application of a cover with a metal-based catalyst. In the present specification, the term "metal-based catalyst" includes titanium oxides.

A conductive metal layer can be provided on the inner surfaces of the pores 15a and 15b in the fuel electrode 11 and the oxygen electrode 13 by atomic layer deposition, electroplating, electrodeposition and like methods.

Figure 2A:
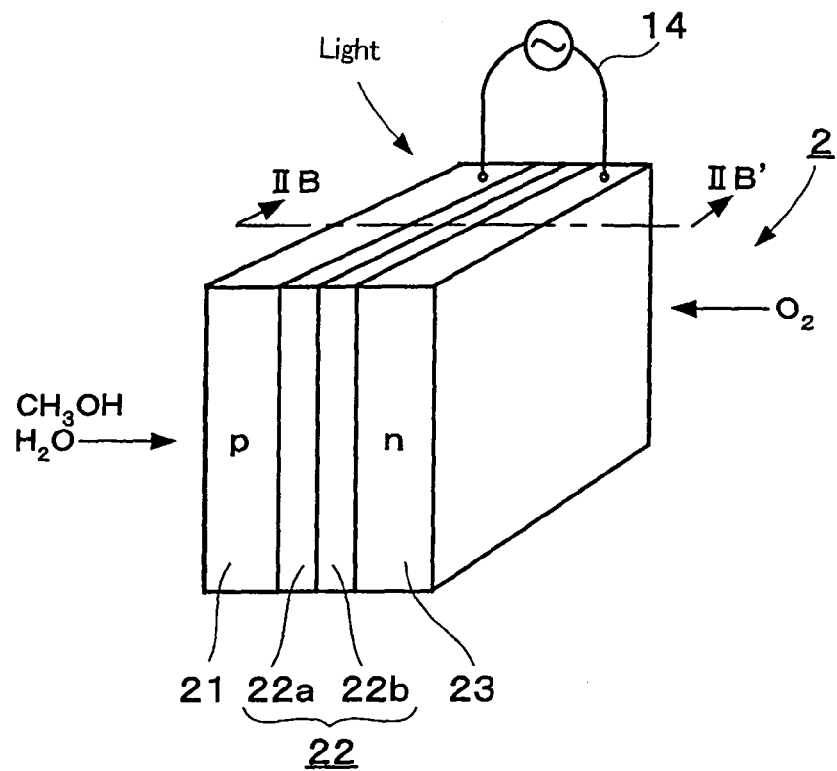
FIG. 2A is a perspective view schematically illustrating the principal structure of the fuel cell unit according to the second embodiment of the present invention.

FIG. 2A is a perspective view schematically illustrating the principal structure of the fuel cell unit according to the second embodiment of the present invention.

Figure 2B:
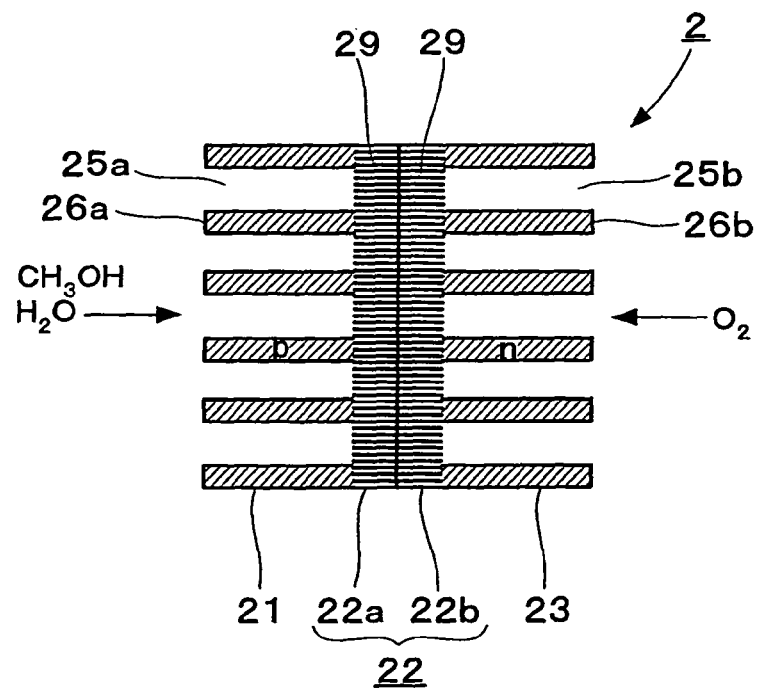
FIG. 2B is an enlarged fragmentary cross-sectional view schematically illustrating the structure of the fuel cell of FIG. 2A taken along the line IIB-IIB'.

FIG. 2B is an enlarged fragmentary cross-sectional view schematically illustrating the structure of the fuel cell of FIG. 2A taken along the line IIB-IIB'.

The cell units 2 shown in FIGS. 2A and 2B has a pn-junction structure, which comprises three layers, i.e., a p-type semiconductor layer 21, an n-type semiconductor layer 23 and an interlayer 22 disposed therebetween. The first layer, i.e., the fuel electrode 21 that is formed from a p-type semiconductor layer, forms an anode. Boron, aluminum and like p-type impurities are doped in the first layer. The second layer is the interlayer 22, which forms an electrolytic region. The third layer is the oxygen electrode 23, which is formed from an n-type semiconductor layer and functions as a cathode. Phosphorus, arsenic and like n-type impurities are doped in the third layer.

The interlayer 22 comprises an interlayer 22a formed on one surface of the silicon substrate that forms the fuel electrode 21 and an interlayer 22b formed on one surface of the silicon substrate that forms the oxygen electrode 23. This type of interlayer 22 eases the production of cell units 2. The interlayer 22 may be formed on either of the fuel electrode 21 or the oxygen electrode 23 instead of forming on both electrodes. In other words, the interlayer 22 may be formed from either of the interlayer 22a or the interlayer 22b. The cell unit 2 is preferably formed by connecting the interlayers 22a and 22b facing each other.

It is preferable that the fuel electrode 21, the interlayer 22 and the oxygen electrode 23 all be formed of porous silicon. As shown in FIG. 2B, pores 25a and 25b are formed in the fuel electrode 21, which is a p-type semiconductor layer, and the oxygen electrode 23, which is an n-type semiconductor layer. The pores 25a and 25b are partitioned by the walls 26a and 26b respectively. The fuel electrode 21 and the oxygen electrode 23 are permeable to methanol and like fuel fluids, and oxygen gas and like oxidizing fluids respectively. In other words, fuel fluids and oxidizing fluids can penetrate in the pores 25a and 25b of the layers. The interlayer 22 is provided with pores 29.

Here, it is preferable that the diameters of the pores 25a, 25b in the fuel electrode 21 and the oxygen electrode 23 be larger than the diameter of the pores 29 in the interlayer 22. For example, the diameters of the pores 25a and 25b is in the micrometer range, specifically not greater than 20 μm, and preferably 4 μm to 8 μm. The diameter of the pores 29 is preferably in the nanometer range. However, when hydrogen or like gaseous materials are used as the fuel fluid, the diameter of the pores 25a and 25b in the fuel electrode 21 and the oxygen electrode 23 may be almost the same as the diameter of the pore 29 in the interlayer 22; for example, both may be in the nanometer range.

The inner surfaces of the pores 25a and 25b in the fuel electrode 21 and the oxygen electrode 23 is covered with a catalyst selected from platinum, iridium, palladium, rhodium, ruthenium and like noble metals and alloys containing at least two thereof. It is more preferable that palladium, nickel, tantalum, niobium or like conductive metal layers be provided between the catalyst layer and the inner surfaces of the pores 25a and 25b.

An electrolyte impregnated in the pores 29 of the interlayer 22 is held in the pores by static forces due to capillary action. Examples of electrolytes include the same as those used in the first embodiment.

It is preferable that at least one of the fuel electrode 21 and the oxygen electrode 23 be optically transparent, so that light can reach the interlayer 22 via the fuel electrode 21 or the oxygen electrode 23. If neither the fuel electrode 21 nor the oxygen electrode 23 is optically transparent, it is preferable that an optical fiber or like means be provided so as to lead light to the interlayer 22.

Furthermore, the fuel electrode 21 and the oxygen electrode 23 are provided with a connecting terminal (not shown) that corresponds to the portion in which these electrodes are connected to an outside circuit 14.

Figure 3A:
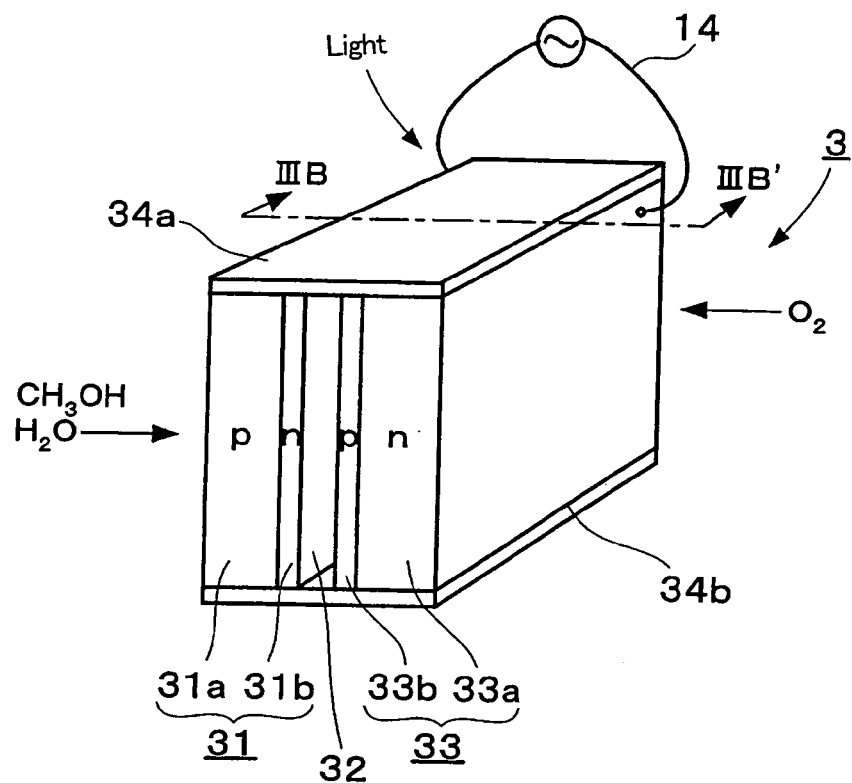
FIG. 3A is a perspective view schematically illustrating the principal structure of the fuel cell unit according to the third embodiment of the present invention.

FIG. 3A is a perspective view schematically illustrating the principal structure of the fuel cell unit according to the third embodiment of the present invention.

Figure 3B:
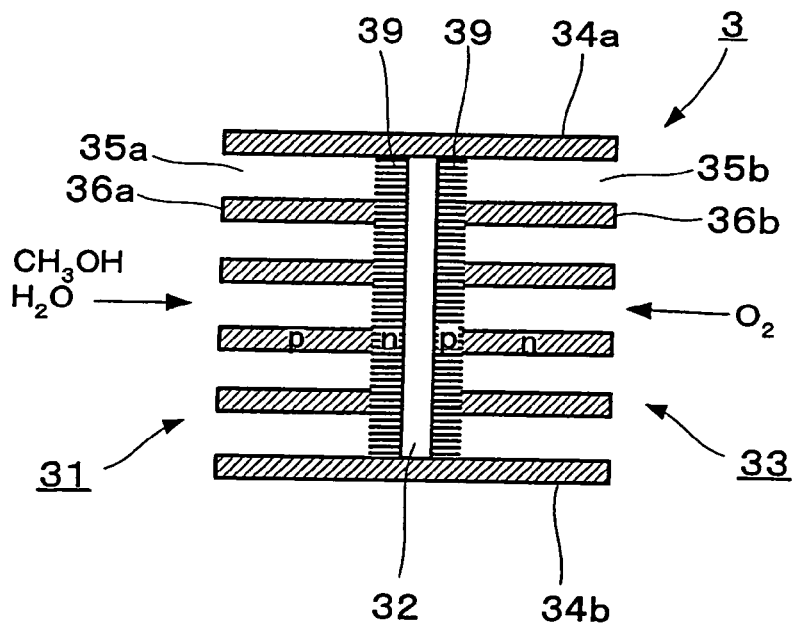
FIG. 3B is an enlarged fragmentary cross-sectional view schematically illustrating the structure of the fuel cell of FIG. 3A taken along the line IIIB-IIIB'.

FIG. 3B is an enlarged fragmentary cross-sectional view schematically illustrating the structure of the fuel cell of FIG. 3A taken along the line IIIB-IIIB'.

The cell unit 3 shown in FIG. 3A and FIG. 3B comprises three layers: two pn-type semiconductor layers having the first and the second pn junction structures, and an interlayer disposed between the two pn-type semiconductor layers. These three layers are arranged pn-interlayer-pn from the fuel electrode side. The first layer is a fuel electrode 31, which forms an anode having a p-type semiconductor layer 31a to which boron, aluminum and like p-type impurities are doped, and an n-type semiconductor layer 31b to which phosphorus, arsenic and like n-type impurities are doped. The second layer is an interlayer 32 that forms an electrolyte region. The third layer is an oxygen electrode 33 that forms a cathode having an n-type semiconductor layer 33a to which phosphorus, arsenic and like n-type impurities are doped, and a p-type semiconductor layer 33b to which boron, aluminum and like p-type impurities are doped.

It is preferable that both the fuel electrode 31 and the oxygen electrode 33 be formed from porous silicon. As shown in FIG. 3B, pores 35a and 35b are formed in the fuel electrode 31 and the oxygen electrode 33, which are semiconductor layers having a pn junction structure. The pores 35a and 35b are partitioned by the walls 36a and 36b respectively. The p-type semiconductor layer 31a of the fuel electrode 31 and the n-type semiconductor layer 33a of the oxygen electrode 33 are permeable to methanol and like fuel fluids, and oxygen gas and like oxidizing fluids respectively. Fuel fluids and oxidizing fluids can penetrate the pores 35a and 35b of each layer.

Here, it is preferable that the diameter of pores 35a and 35b in the p-type semiconductor layer 31a of the fuel electrode 31 and in the n-type semiconductor layer 33a of the oxygen electrode 33 be greater than that of the pores 39 formed in the n-type semiconductor layer 31b of the fuel electrode 31 and the p-type semiconductor layer 33b of the oxygen electrode 33. The diameter of pores 35a and 35b is preferably in the micrometer range, for example, not greater than 20 µm, and more preferably from 4 µm to 8 µm. The diameter of the pores 39 is preferably in the nanometer range. However, when a hydrogen or like gaseous material is used as the fuel fluid, the diameter of pores 35a and 35b in the p-type semiconductor layer 31a of the fuel electrode 31 and in the n-type semiconductor layer 33a of the oxygen electrode 33 may be almost the same as that of the pores 39 formed in the n-type semiconductor layer 31b of the fuel electrode 31 and the p-type semiconductor layer 33b of the oxygen electrode 33. For example, the pores 35a, 35b and 39 may be in the nanometer range.

The thickness of the p-type semiconductor layer 31a in the fuel electrode 31 and the n-type semiconductor layer 33a in the oxygen electrode 33 is preferably greater than that of the n-type semiconductor layer 31b in the fuel electrode 31 and the p-type semiconductor layer 33b of the oxygen electrode 33. The thickness of the p-type semiconductor layer 31a and the n-type semiconductor layer 33a is preferably in the micrometer range, specifically from 300 µm to 500 µm, and the thickness of the n-type semiconductor layer 31b and the p-type semiconductor layer 33b is preferably not greater than 50 µm, and more preferably not greater than 10 µm.

The inner surfaces of the pores 35a in the p-type semiconductor layer 31a of the fuel electrode 31 and the inner surfaces of the pores 35b in the n-type semiconductor layer 33a of the oxygen electrode 33 are covered with a catalyst selected from platinum, iridium, palladium, rhodium, ruthenium and like noble metals and alloys containing at least two thereof. It is preferable that palladium, nickel, tantalum, niobium and like conductive metal layers be provided between the inner surfaces of the pores 35a, 35b and the catalyst layer.

The upper and bottom portions of the interlayer 32 are sealed with sealing plates 34a and 34b. The space between the fuel electrode 31 and the oxygen electrode 33 is filled with an electrolyte similar to that used in the first and second embodiments.

It is preferable that at least one of the fuel electrode 31 and the oxygen electrode 33 be optically transparent, so that light can reach the interlayer 32 via the fuel electrode 31 or the oxygen electrode 33. If neither the fuel electrode 31 nor the oxygen electrode 33 is optically transparent, it is preferable that at least one of the sealing plates 34a or 34b be optically transparent so as to lead light to the interlayer 32 via the sealing plate 34a or 34b. An optical fiber or like means may be provided so as to lead light to the interlayer 32.

The fuel electrode 31 and the oxygen electrode 33 are provided with connecting terminals (not shown) which correspond to the portions connecting with the outside circuit 14.

FIGS. 1B, 2B and 3B show the patterns wherein the cross sections of the pores in the fuel fluid transmission section of the fuel electrode and the oxidizing fluid transmission section of the oxygen electrode are identically square, i.e., have a systematic configuration. However, the size and shape of the pores does not have to be uniform. The pattern does not have to be straight, but may be also curved in the depth direction. The shapes, distribution and like patterns of the fuel electrode and the oxygen electrode, seen from a planar view, are not specifically limited.

Figure 4A:
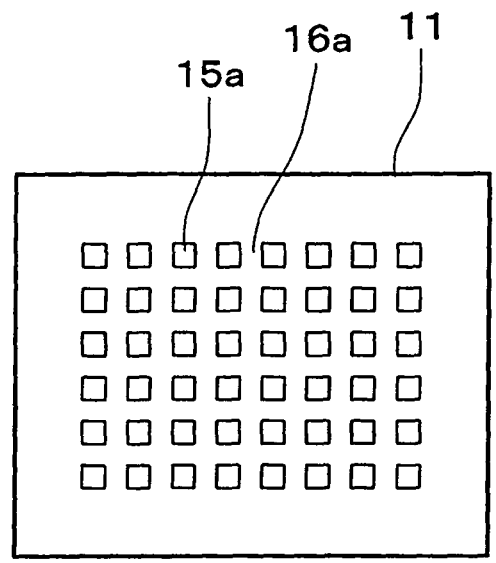
FIG. 4A is a plan view schematically illustrating one example of distributions and shapes of the pores in the fuel electrode.
Figure 4B:
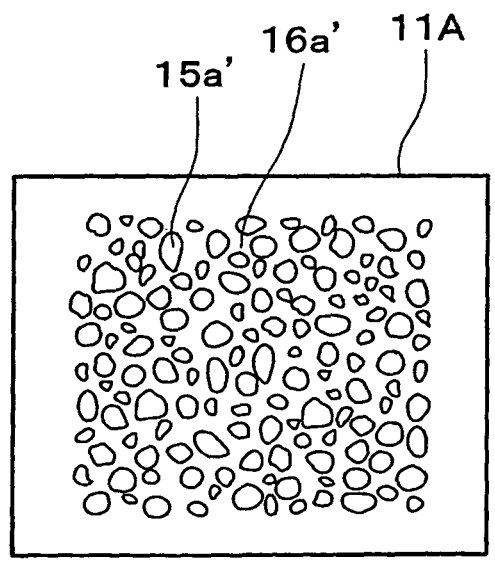
FIG. 4B is a plan view schematically illustrating another example of distributions and shapes of the pores in the fuel electrode.

FIGS. 4A and 4B are schematic plan views illustrating examples of the distributions and shapes of the pores in the fuel electrode. FIGS. 4A and 4B illustrate one example of the fuel electrode 11 in the cell unit 1 of the first embodiment. FIG. 4A illustrates an example wherein the pores, having a planar uniform shape, are regularly arranged. The pores 15a do not have to have a planar uniform shape, and may have different shapes and be arranged irregularly. The pores 15a' in the fuel electrode 11A shown in FIG. 4B have irregular planar shapes and irregularly distributed with being partitioned by the walls 16a'. As shown in FIG. 4B, the pores 15a' may have an irregular planar shape and an irregular arrangement.

The amount of the electric current generated in the cell units 1 to 3 depends on the area of the cell units 1 to 3 and the concentration of the impurities in the fuel electrode and oxygen electrode. In order to attain the desired performance and commercial-scale production, the cell units 1 to 3 preferably have a length and width of 5 mm to 30 mm, and a thickness ranging from in the micrometer range to several mm.

In the cell units 1 to 3 of the first to third embodiments, the reaction in the fuel electrode and the oxygen electrode are activated and electric power is effectively generated. The availability of the effective electric power generation is described below, mainly in reference to the cell unit 1 of the first embodiment. The cell units 2 and 3 of the second and third embodiments are also referred to, when necessary.

When methanol as a fuel fluid and water ($H_2O$) are supplied on the surface of the fuel electrode 11, the reaction shown in Formula (1) occurs: the fuel fluid and water dissociate into hydrogen ions (H+) and electrons (e−), and carbon dioxide ($CO_2$) is formed. Because the interlayer 12 is an intrinsic semiconductor layer, the electrons cannot migrate in the interlayer 12. Because pn junctions exist, in cell unit 2, between the fuel electrode 21 and the oxygen electrode 23; and in cell unit 3, between the fuel electrode 31 and in the oxygen electrode 33, the migration of the electrons from the fuel electrode to the oxygen electrode is prevented. In cell unit 3, because the interlayer 32 is formed of an electrolyte, the interlayer 32 can prevent the migration of electrons.

In contrast, hydrogen ions can migrate to the oxygen electrode 13 through the electrolyte held in the pores 19 in the interlayer 12 (in cell unit 2, the pores 29 in the interlayer 22; and in the interlayer 32 of cell unit 3). At the oxygen electrode 13, the electrons migrated to the oxygen electrode 13 via the outside circuit 14, the hydrogen ions migrated via the electrolyte in the interlayer 12, and the oxygen gas supplied to the surface of the oxygen electrode 13 react as shown in Formula (2), generating water ($H_2O$).

In cell unit 1 of the first embodiment, because the reactions at the fuel electrode 11 and the oxygen electrode 13 are remarkably stimulated by the mechanism described below, the series of the above-mentioned reactions can be significantly accelerated. In other words, because cell unit 1 has a pin structure, the interlayer 12 of the intrinsic semiconductor layer, which is the i layer, (the interlayer 22 of cell unit 2, and the combination of the interlayer 32 and the pn junction portions in the fuel electrode 31 and the oxygen electrode 33 in cell unit 3), which is the intrinsic semiconductor layer (i layer), serves a very important role not observed in known fuel cells.

At thermal equilibrium, the holes migrate from the fuel electrode 11 of the p-type semiconductor layer to the interlayer 12, and electrons migrate from the oxygen electrode 13 of the n-type semiconductor layer to the interlayer 12. Therefore, the electrons and holes recombine in the interlayer 12, and a depletion region is formed. As a result, a strong electric field is formed from the oxygen electrode 13 to the fuel electrode 11.

By this process, excited electrons and holes are generated as described earlier. In particular, when light reaches the interlayer 12, because the depletion layer in the vicinity of the interlayer 12 is irradiated with light, excited electrons and holes can be formed efficiently. When electrons and holes are generated, they are accelerated by the electric field based on the depletion layer; the electrons migrate to the oxygen electrode 13 of the n-type semiconductor layer, and the holes migrate to the fuel electrode 11 of the p-type semiconductor layer. Through the migration of electrons and holes, the potential difference between the fuel electrode 11 and the oxygen electrode 13, i.e., between the anode and the cathode, reaches equilibrium with the potential of the interlayer 12.

In the case of a solar cell having a pin structure, the potential difference is used as a source of electric power because the high intensity of the solar irradiation produces a large number of holes and electrons, and these holes and electron move in the potential difference. However, in the case of the cell units 1 to 3 of the first to third embodiments, because the potential difference required is generated with the smallest possible current, light is not necessarily required and the intensity of the light may be weak, even if irradiated. By the generated potential difference, the reactions at the fuel electrode 11 and the oxygen electrode 13 can be accelerated independently, so that the catalytic activity at each electrode can be significantly improved. Accordingly, the oxidation reaction at the fuel electrode 11 and the reduction reaction at the oxygen electrode 13 can be remarkably activated. As a result, the reaction of Formula (1) is accelerated at the fuel electrode 11 and the reaction of Formula (2) is accelerated at the oxygen electrode 13.

Therefore, when the electric power generated by the cell unit 1 is fixed, the amount of the catalyst can be reduced. Accordingly, the electrode can be miniaturized, resulting in a reduction in the size and cost of the fuel cell. When the size of the fuel cell is fixed, the generation of electric current per unit area can be increased, i.e., a greater amount of electric power can be generated by a fuel cell of the same size.

Even if a small amount of CO gas is present in the fuel fluid, because the fuel electrode 11 has high oxidation reactivity, the CO gas can be easily oxidized to form $CO_2$. Therefore, when platinum is used as a catalyst, the reaction between platinum and CO gas, i.e., CO poisoning of platinum, can be prevented and the excellent catalytic activity of platinum can be maintained for a long time.

The basic structure and operation mechanism of the unit cell are explained above with reference to unit cell 1. Because cell units 2 and 3 have the same principal operational mechanism, the explanations thereof are omitted here. Regarding cell units 1 and 2 of the first and second embodiments, the electrolyte is held in the pores 19 and 29, in the porous interlayers 12 and 22, by static forces due to capillary action. In other words, the electrolyte can be held when the minimum capillary pressure is not less than $P_c$, as shown in equation (3) (the law of static forces) below.

$$P_c = 2\delta/r \cdot \cos\theta \approx 2\delta/r \qquad (3)$$

Here, $P_c$ is the capillary pressure in the pores (Unit: $N/m^2$), r is the radius of the pores (Unit: m), δ is the surface tension of the electrolyte (Unit: N/m), and θ is the wet angle (Unit: °). Therefore, it is preferable that the radii of the pores of the interlayer 12 be suitably selected depending on the surface tension δ of the electrolyte held in the pores, and the wet angle θ of the electrolyte in reference to the semiconductor material.

As described above, in the cell units 1 to 3 of the first to third embodiments, when methanol is used as the fuel fluid, it is preferable that pores in the nanometer range exist between the pores in the micrometer range in the fuel fluid supply portion of the fuel electrode and the pores in the micrometer range in the oxidizing fluid supply surface of the oxygen electrode. Pores with micrometer range-diameters are so designed that the specific surface area of the electrode portion is enlarged and a fuel fluid or oxidizing fluid can enter into the pores. Furthermore, in the first and second embodiments, nanometer range-pores are designed to hold the electrolyte and prevent methanol crossover. In the third embodiment, nanometer range-pores are designed to prevent methanol crossover. Explained below is the reason why methanol crossover can be prevented without adversely affecting the performance of the fuel cell.

Figure 5:
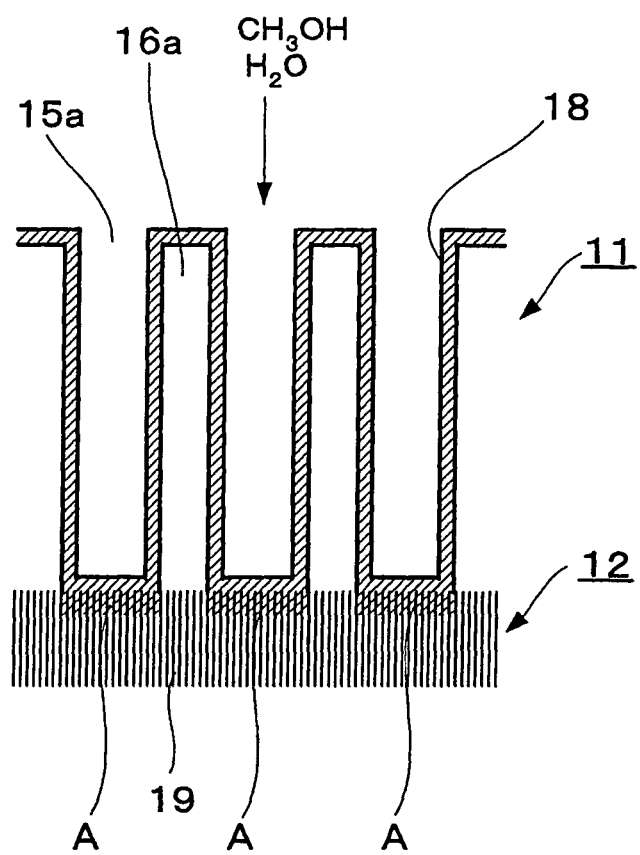
FIG. 5 is an enlarged fragmentary cross-sectional view schematically illustrating the region formed from pores having diameters in the micrometer range and in the nanometer range.

FIG. 5 is an enlarged fragmentary cross-sectional view schematically illustrating the region formed from pores having micrometer range-diameters, and pores with nanometer range-diameters. FIG. 5 shows, as one example, the fuel electrode 11 in the cell unit 1 of the first embodiment.

In the fuel electrode 11 shown in FIG. 5, the p-type semiconductor layer portion in the fuel electrode 11 is provided with pores 15a that are partitioned by walls 16a, wherein the inner surfaces of the pores 15a are provided with a conductive metal layer 18 formed of palladium (Pa), nickel (Ni), tantalum (Ta), niobium (Nb) or like metal. The metal-based catalyst layer formed on this layer is not shown. The thus-formed conductive metal layer increases the conductivity of the fuel electrode 11 formed of silicon, etc., and prevents methanol crossover.

Hydrogen ions should migrate from the fuel electrode 11 to the oxygen electrode 13 (see FIG. 1B). In the above-mentioned metal, because hydrogen ions diffuse throughout the metal layer, migration of hydrogen ions is not hampered even if the inner surfaces of the walls of pores 15a are provided with a conductive metal layer 18. In other words, the hydrogen ions reaching the surface of the conductive metal layer 18 are adsorbed in the metal surface and accept electrons from the metal layer, and then diffuse in the conductive metal layer 18 in the form of hydrogen atoms. The diffused hydrogen atoms reach the other side of the conductive metal layer 18, i.e., walls 16a or interlayer 12. The hydrogen atoms release electrons there and then migrate from the conductive metal layer 18 to the p-type semiconductor layer in the fuel electrode 11, or to the interlayer 12, in the form of hydrogen ions. Therefore, even if the conductive metal layer 18 is provided, migration of the hydrogen ions from the fuel electrode 11 to the oxygen electrode 13 is not disturbed.

In contrast, methanol cannot pass through the conductive metal layer 18. Therefore, methanol does not migrate from the fuel electrode 11 to the oxygen electrode 13, and, accordingly, methanol crossover in cell unit 1 can be almost completely prevented. As shown in FIG. 5, among the nanometer-range pores 19 that exist in the interlayer 12 and open to the bottom of the pores 15a in the fuel electrode 11, the conductive metal fills in the pores that exist in the region A adjacent to the bottom of the pores 15a. Therefore, methanol crossover can be efficiently prevented.

The preferable method for producing cell units 1 to 3 of the first to third embodiments is described below. There are roughly two methods to produce the fuel electrode, oxygen electrode and interlayer that form the principal part of cell units 1 to 3. In the first method, pores are formed regularly, in a predetermined pattern, as shown in FIG. 4A. In the second method, irregular pores, as shown in FIG. 4B, are formed by random distribution. The second method can be accomplished by, for example, forming a plate-like shape by CVD, chemical etching of the plate-like semiconductor material using sodium fluoride, and anodic etching using a hydrogen fluoride (HF) solution, etc. However, the first method, described below, is more desirable as the method for forming the porous portion.

Figure 6:
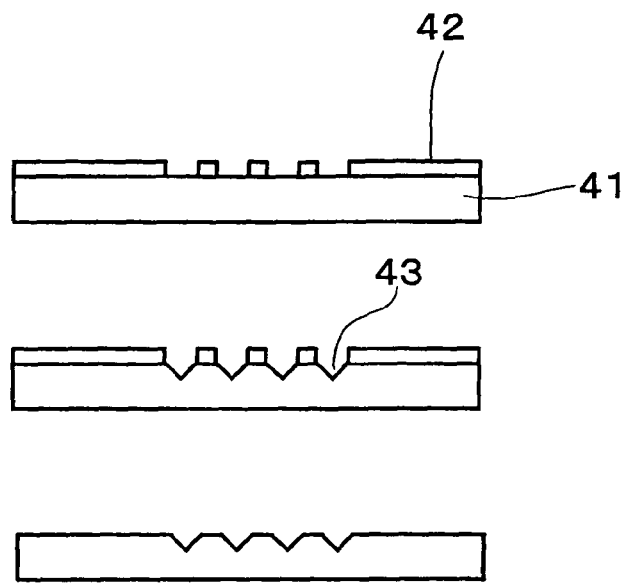
FIG. 6 illustrates the steps for forming a porous portion having a predetermined pattern, specifically showing the cross-sectional structures of the substrates during the pre-etching steps conducted on the substrate to form the porous portions.
Figure 7:
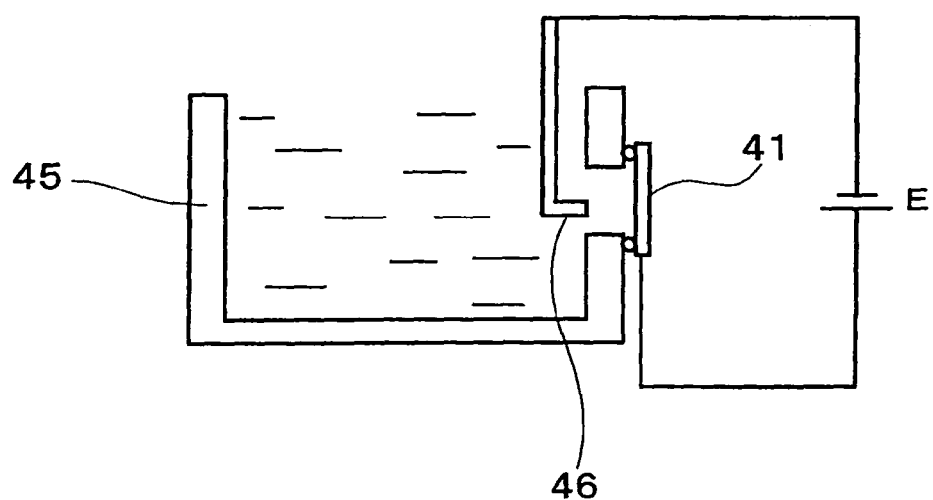
FIG. 7 illustrates the steps for forming a porous portion having a predetermined pattern, specifically schematically showing the cross-sectional view of the step in which anodic etching is conducted after the pre-etching of the substrate.

FIGS. 6 and 7 illustrate the first method, wherein a porous portion having a predetermined pattern is formed. FIG. 6 illustrates the cross-sectional structures of the substrates during the pre-etching steps conducted to the substrate to form a porous portion. FIG. 7 schematically illustrates the cross-sectional view of the step in which anodic etching is conducted after the pre-etching of the substrate. Note that an example wherein the substrate is silicon is explained below.

During the formation of porous silicon with patterned pores, a silicon substrate 41 formed from a p-type semiconductor or an n-type semiconductor is first formed by ion-implantation or like method. Subsequently, a mask 42 with a desirable pattern is formed on one surface of the silicon substrate 41 by photolithography, which is generally employed during the production of the semiconductor device. Thereafter, pre-patterning of the silicon substrate 41 is conducted by anisotropy etching using a potassium hydroxide (KOH) solution with provided with the patterned mask. By this pre-patterning, a concave portion 43 is formed in the silicon substrate 41. The mask 42 is then removed.

Subsequently, the pre-patterned portion is further etched by the anodic etching shown in FIG. 7, so as to obtain deeper pores. In the apparatus shown in FIG. 7, hydrogen fluoride (HF) or a like electrolyte is accommodated in the vessel 45, and the platinum electrode 46 is dipped therein. In FIG. 7, a silicon substrate 41 is disposed in the opening of the wall of the vessel 45 in a watertight manner, so as to face the platinum electrode 46. Furthermore, the platinum electrode 46 is connected to the negative side of the power source E, and the silicon substrate 41 is connected to the positive side of the power source E. When the silicon substrate 41 is an n-type semiconductor, photochemical HF anodic etching using light is conducted; when the silicon substrate 41 is a p-type semiconductor, HF anodic etching without using light is conducted.

By the HF anodic etching shown in FIG. 7, for example, patterned pores 15a and 15b, shown in FIG. 1B, are formed in the silicon substrate 41. The diameter of the pores depends on the etching conditions such as the wafer resistivity, photocurrents, concentration of HF solution, etc. Therefore, it is preferable that the etching conditions be selected depending on the objective pore diameter. The depth of the pores depends on the time of etching.

After conducting etching to the predetermined depth, if the formation of pores 19 (for example, having a nanometer range-diameter) in the interlayer 12 is required on the bottom of the pores 15a (for example, having a micrometer range-diameter) as shown in FIG. 1B, the anodic etching is conducted under an increased current and the electrolyte (HF) concentration.

In order to make the diameter of the pores in the fuel electrode and the oxygen electrode and the diameter of the pores in the interlayer substantially the same, anodic etching to the oxygen electrode and interlayer is conducted at the same electrolyte concentration, current, etc.

In the above-mentioned method, the pores are formed from one surface of the silicon substrate. However, it is also possible to form pores having a large diameter, i.e., in the micrometer range, from one surface of the silicon substrate and pores having a small diameter, i.e., in the nanometer range, from another surface of the silicon substrate. This method is particularly suitable for forming pores in the fuel electrode 21 and oxygen electrode 23 in cell unit 2 of Embodiment 2 and pores in the fuel electrode 31 and oxygen electrode 33 in cell unit 3 of Embodiment 3.

Ion implantation is conducted on the silicon substrate so that an n-type or p-type semiconductor is obtained. It is more desirable, in order to increase the electric conductivity of the fuel electrode or oxygen electrode and reduce ohmic losses, that re-doping be conducted after etching. For example, it is desirable to re-dope an oxygen electrode formed of an n-type semiconductor with phosphorus (P), and to re-dope a fuel electrode formed of a p-type semiconductor with boron (B). During such doping, ion implantation, CVD, thermal diffusion, etc., may be employed. Although the following example is not shown, when phosphorus is doped, an alcohol solution of phosphorus acid ($H_3PO_4$) is infused in the pores; when boron is doped, an alcohol solution of boric acid ($H_3BO_4$) is infused in the pores, and then heated at 1,200° C. for four hours. By this process, doping of P or B in the inner surface of pores can be completed.

The relationship between the formation of the porous portions in the fuel electrode, oxygen electrode and interlayer and the formation of the cell units is explained below.

In production of cell unit 1 of the first embodiment, the fuel electrode 11, the interlayer 12, and the oxygen electrode 13 are separately formed, and then, as shown in FIG. 1A, the interlayer 12 is sandwiched between the fuel electrode 11 and the oxygen electrode 13, so that cell unit 1 is obtained. It is also possible to form cell unit 1 in a united manner by forming pores 15a in the fuel electrode 11 side surface, pores 15b in the oxygen electrode 13 side surface and then pores 19 in the middle using one single silicon substrate.

In production of cell unit 2 of the second embodiment, the fuel electrode 21 and the oxygen electrode 23 are separately formed, and then attached as shown in FIG. 2A. The pores 29 may be formed in either side of the fuel electrode 21 and the oxygen electrode 23. Cell unit 2 may be unitedly formed using one single silicon substrate, forming pores 25a and 29 in the fuel electrode 21 side and pores 25b and 29 in the oxygen electrode 23 side. However, in this case, the pores 29 are formed in either the fuel electrode 21 or the oxygen electrode 23.

In cell unit 3 of the third embodiment, the fuel electrode 31 and the oxygen electrode 33 are separately formed, and cell unit 3 is fabricated in such a manner that, as shown in FIG. 3A, a gap is formed between the fuel electrode 31 and the oxygen electrode 33 using the sealing plates 34a and 34b.

The process to make the cell units 1 to 3 produced by the above-mentioned methods to hold an electrolyte is as below. In the case of cell units 1 and 2, it is necessary that the electrolyte be held in the porous portion in the nanometer range. If the electrolyte is an $H_2SO_4$, $H_3PO_4$, triflic acid or like solution, the fabricated cell units 1 and 2 are dipped in the electrolyte vessel for about 12 hours. When a solid electrolyte polymer is used as the electrolyte, fabricated cell units 1 and 2 are dipped in a Nafion solution.

Figure 8:
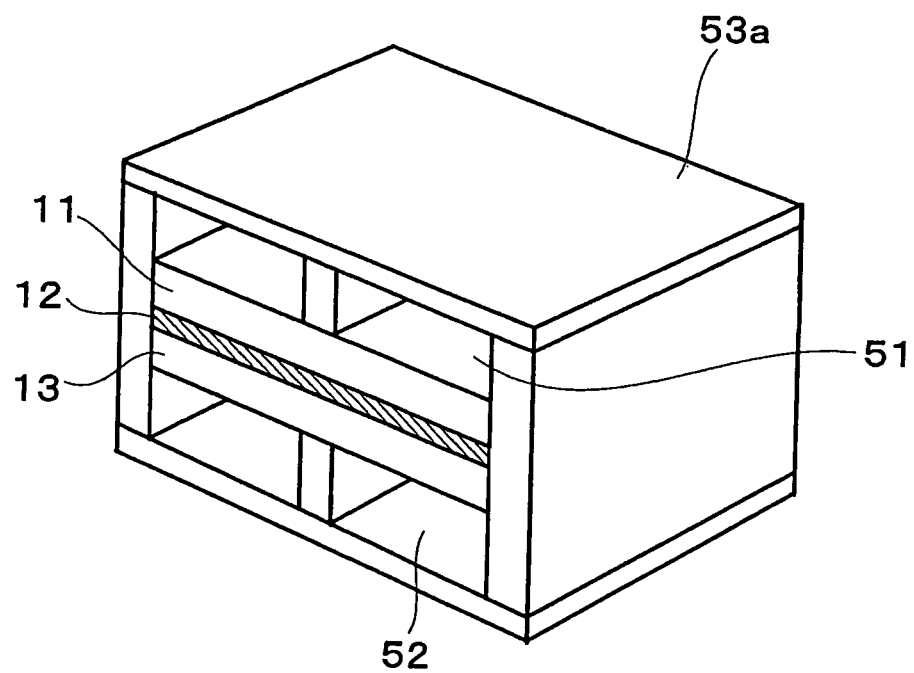
FIG. 8 is a schematic perspective view illustrating one example of the means for supplying the fuel fluid and oxidizing fluid.
Figure 9:
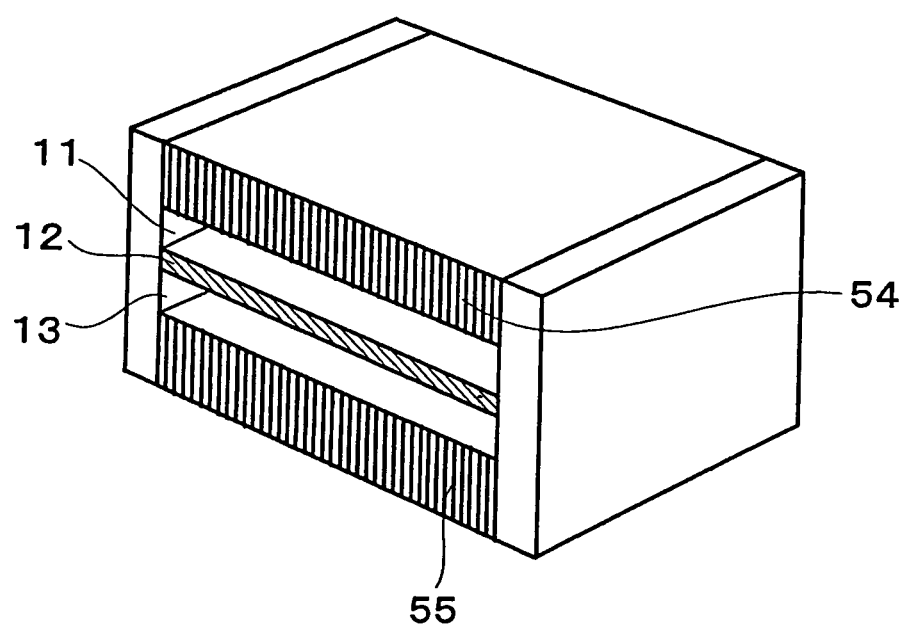
FIG. 9 is a schematic perspective view illustrating another example of the means for supplying the fuel fluid and oxidizing fluid.

FIGS. 8 and 9 are perspective views schematically showing one example of a method to supply a fuel fluid and oxidizing fluid. FIGS. 8 and 9 indicate cell unit 1 as one example.

Both the fuel fluid feed portion 51 and the oxidizing fluid feed portion 52 shown in FIG. 8 have a channel structure, wherein the channel portion is airtightly or watertightly sealed by the plates 53a and 53b. This channel portion can be formed by, for example, conduction of patterning using photolithography, and anisotropy etching using a KOH solution in the fuel fluid supply portion surface of the fuel electrode 11 and the oxidizing fluid supply surface of the oxygen electrode 13.

The fuel fluid feed portion 54 and the oxidizing fluid feed portion 55 shown in FIG. 9 are formed from a porous material, and a fuel fluid or an oxidizing fluid is held in the pores of the porous material. When the fuel fluid is a hydrogen gas, a hydrogen absorbing alloy may be used as a material for the fuel fluid feed portion 54.

FIGS. 8 and 9 show cases wherein the fuel fluid feed portion and the oxidizing fluid feed portion have the same structure; however, the fuel fluid feed portion may have a channel structure, and the oxidizing fluid feed portion may be formed of a porous material, and vice versa. The fuel fluid feed portion and the oxidizing fluid feed portion can be suitably selected depending on the application, desired function and the like of cell unit 1.

Figure 10A:
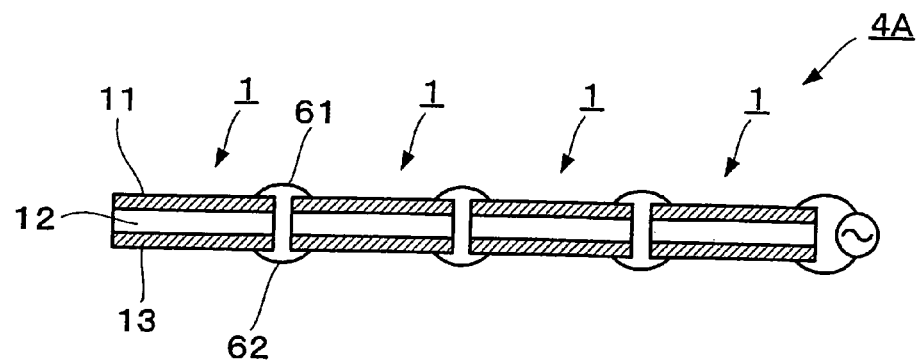
FIG. 10A is a cross-sectional view schematically illustrating a cell unit array according to one embodiment of the present invention, wherein cell units are connected in parallel.
Figure 10B:
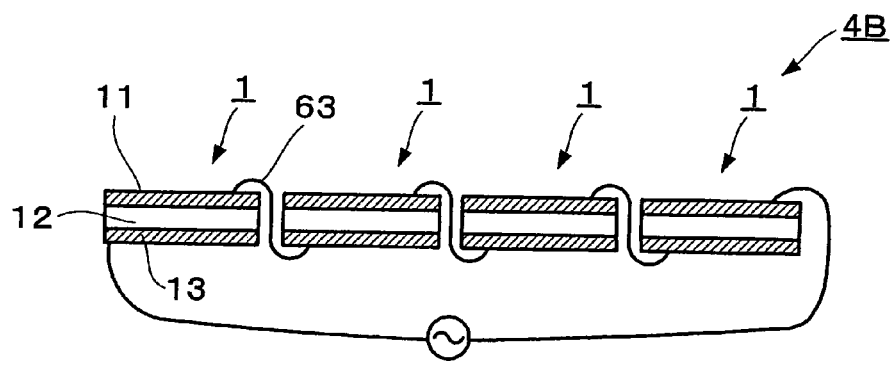
FIG. 10B is a cross-sectional view schematically illustrating a cell unit array according to one embodiment of the present invention, wherein the cell units are connected in series.
Figure 10C:
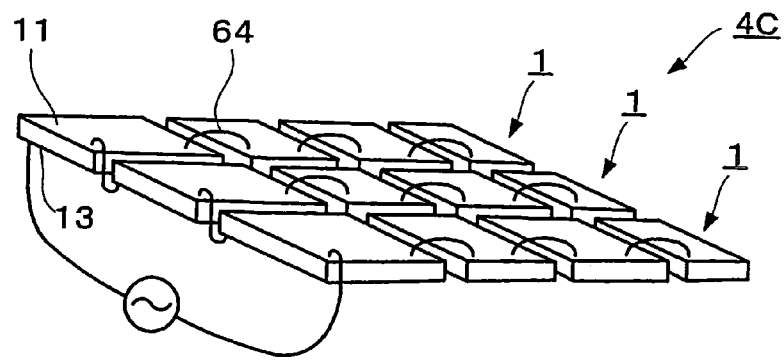
FIG. 10C is a perspective view schematically illustrating a cell unit array according to one embodiment of the present invention, wherein cell units are connected vertically and horizontally.

FIGS. 10A to 10C schematically illustrate the cell unit array according to the embodiment of the present invention. FIG. 10A is a cross-sectional view showing cell unit array 4A, wherein cell units are connected in parallel. FIG. 10B is a cross-sectional view showing cell unit array 4B wherein cell units are connected in series. FIG. 10C is a perspective view showing cell unit array 4C wherein the cell units are connected horizontally and vertically. In the explanation below, cell unit arrays 4A-4C are referred to as cell unit array 4. FIGS. 10A to 10C show cell unit 1 as one example.

FIG. 10A is a cross-sectional view showing cell unit array 4A, wherein a plurality of cell units 1 are arranged in a planer manner and electrically connected in parallel. The larger the area of cell unit 1, the more electric current flows. In order to increase the generated electric current, enlarging the area of cell unit 1 is one alternative. When enlarging cell unit 1 is difficult from the viewpoint of mechanical strength, it is preferable that cell unit 1 be connected in parallel as shown in FIG. 10A. In other words, the fuel electrodes 11 are connected to each other and the oxygen electrodes 13 are connected to each other in cell unit 1 using the outside circuits 61 and 62.

FIG. 10B is a cross-sectional view showing cell unit array 4B wherein the plurality of cell units 1 are arranged in a planer manner and electrically connected in series. The electromotive force of the cell unit 1 depends on the fuel and oxygen. For example, in the case of the hydrogen fuel cell using hydrogen, the ideal output voltage is about 1.229 V. However, due to the overpotential that irreversibly occurs at the electrodes, the actual output voltage of the hydrogen fuel cell is around 0.6 to 0.85 V. By employing the pin or pn semiconductor structure of the present embodiment, overpotential can be remarkably reduced.

If it is necessary to increase the voltage, the unit cells 1 can be connected in series as shown in FIG. 10B. In other words, the fuel electrode 11 and the oxygen electrode 13 are connected via the outside circuit 63.

FIG. 10C is a perspective view illustrating cell unit array 4C wherein a plurality of cell units 1 are arranged in a planer manner and connected vertically and horizontally. When it is necessary to increase the voltage and the electric current, it is preferable that the cell units 1 be arranged vertically and horizontally as shown in FIG. 10C, and cell units 1 in the line direction are connected in parallel as shown in FIG. 10A, and they are connected in series in the row direction as shown in FIG. 10B. If a cell unit 1 having a wide area can be used, in place of the cell units in the line direction those connected in parallel, the wide cell unit is used.

Figure 11:
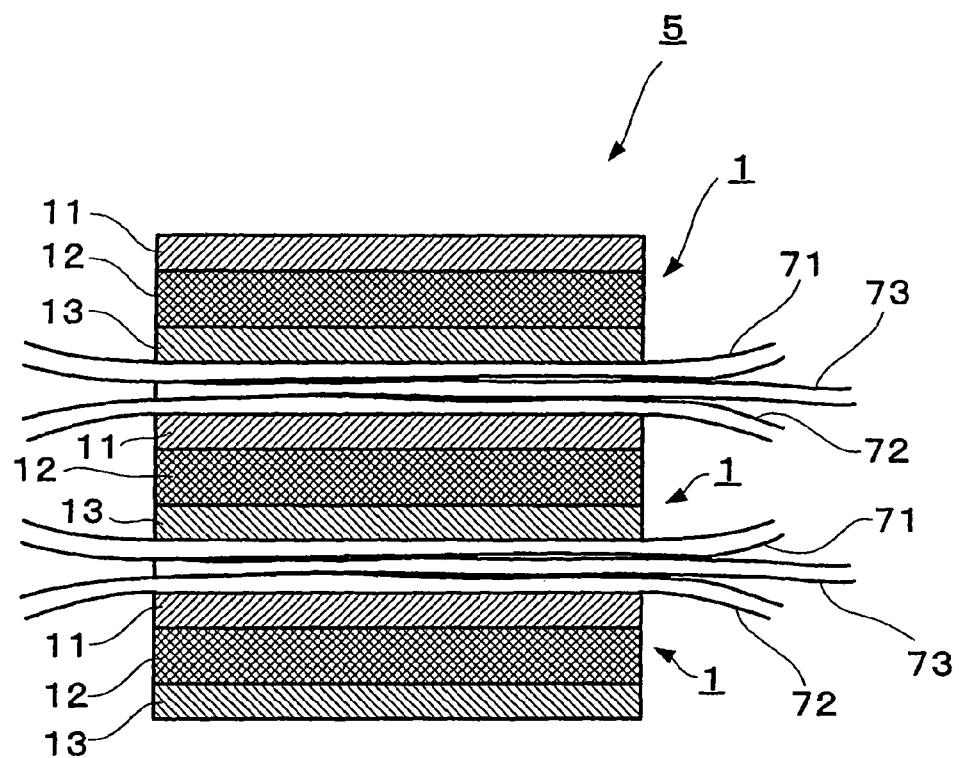
FIG. 11 is a cross-sectional view schematically illustrating a cell unit array according to another embodiment of the present invention.

FIG. 11 is a cross-sectional view schematically illustrating a cell unit array according to another embodiment of the present invention. In FIG. 11, one example using cell unit 1 is illustrated. The cell unit array according to another embodiment is a stacked-type array wherein a plurality of cell units 1 are laminated so as to be connected in series. As shown in FIG. 11, flow field plates 71, 72 and an optical fiber 73 are disposed between each cell unit array 1.

The flow field plates 71 and 72 are thin films, and provided with grooves or capillaries (not shown) to allow gases and like fluids to pass through. The flow field plate 71 supplies, for example, air and like oxidation gases to the oxygen electrode 13. The flow field plate 72 supplies, for example, methanol and like fuel fluids to the fuel electrode 11, as well as discharges excess fluids, generated water, etc. A plurality of optical fibers 73 are inserted between the flow field plates 71 and 72, so that light can reach the interlayer 12 via the fuel electrode 11 or oxygen electrode 13. The optical fiber is structured so that the coating on the portion between the flow field plates 71 and 72 is removed, so as to lead light to the interlayer 12.

The fuel electrode 11 and the oxygen electrode 13 are electrically connected between the laminated cell units 1. Such an electrical connection can be achieved, when the flow field plates 71 and 72 are electrically conductive materials, by directly connecting the flow field plates 71 and 73 in the portion except where the optical fiber 73 is formed. When the flow field plates 71 and 73 are electrically nonconductive material, the fuel electrode 11 and the oxygen electrode 13 are electrically connected using a conductor.

By the cell unit array 5 structured as described above, a stack-type cell unit array wherein cell units 1 are laminated can be obtained. The stack-type cell unit array 5 can generate a voltage corresponding to the number of the laminated cell units 1.

Figure 12A:
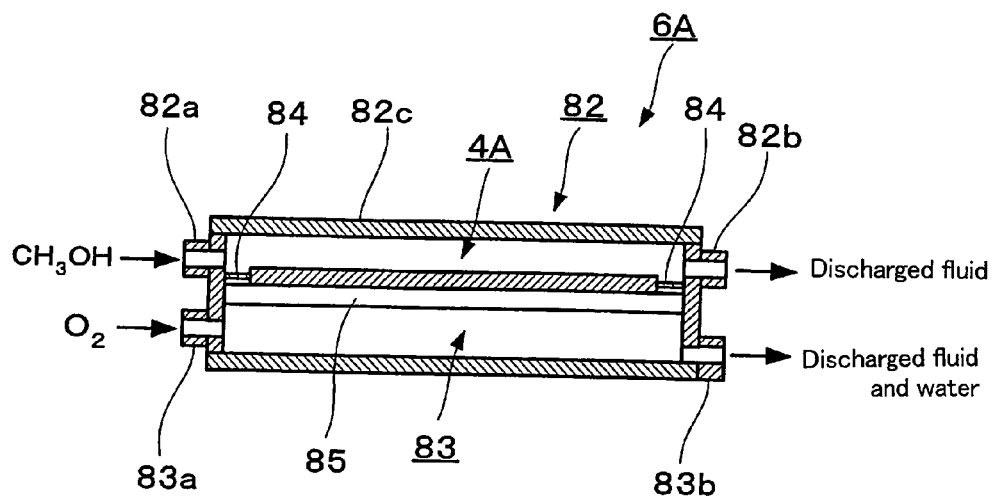
FIG. 12A is a cross-sectional view schematically illustrating a fuel cell module according to one embodiment of the present invention.

FIG. 12A is a cross-sectional view schematically illustrating a fuel cell module according to one embodiment of the present invention. FIG. 12A shows one example using the cell unit array 4A. The fuel cell module 6A shown in FIG. 12A is provided with the cell unit array 4A, a fuel fluid feed portion 82 and an oxidizing fluid feed portion 83. The fuel fluid feed portion 82 and the oxidizing fluid feed portion 83 are partitioned by the cell unit array 4A. The partition member 84, shown in FIG. 12A, is optionally provided as necessary.

As will be described later, the cell unit array 4A is so structured that a predetermined voltage and electric current can be output, wherein the fuel electrode side surface thereof faces the fuel fluid feed portion 82. The cell unit array 4A is held between the fuel fluid feed portion 82 and the oxidizing fluid feed portion 83 by the supporting member 85, therefore the fuel fluid and the oxidizing fluid do not pass through the cell unit array 4A.

A fuel fluid is introduced from the fuel fluid inlet 82a to the fuel fluid feed portion 82, and excess fluid is discharged from the fluid outlet 82b. Among the walls of the fuel fluid feed portion 82, the wall facing cell unit array 4A is an optically transparent window 82c, which is made of glass or an optically transparent material.

An oxidizing fluid is introduced from the oxidizing fluid inlet 83a to the oxidizing fluid feed portion 83, and the excess oxidizing fluid and water is discharged from the fluid/water outlet 83b.

When, for example, methanol and like fuel fluids are introduced from the fuel fluid inlet 82a of the fuel fluid feed portion 82, and an oxygen gas and like oxidation gases are introduced from the oxidizing fluid inlet 83a of the oxidizing fluid feed portion 83 to the fuel cell module 6A having the above-described structure, the reactions at the fuel electrode 11 and the oxygen electrode 13 are activated by the light reaching interlayer 12 of the cell unit array 4A (see FIG. 10A) through the optically transparent window 82c. The reaction shown in Formula (1) is accelerated at the fuel electrode 11 and the reaction shown in Formula (2) is accelerated at the oxygen electrode 13. Accordingly, electric power is generated in the cell unit array 4A and output from the fuel cell module 6A, via the collector (not shown) provided at the fuel electrode 11 and the oxygen electrode 13 as a current collector layer.

Figure 12B:
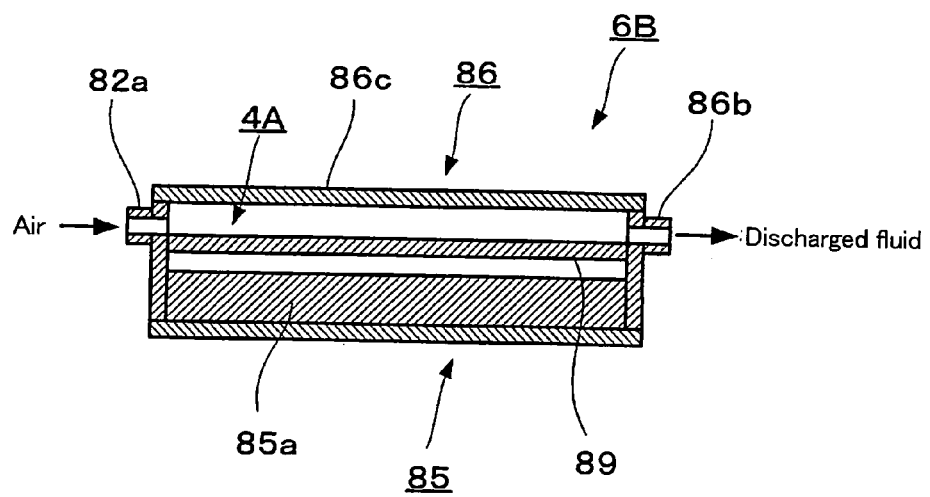
FIG. 12B is a cross-sectional view schematically illustrating a fuel cell module according to another embodiment of the present invention.

FIG. 12B is a cross-sectional view schematically illustrating a fuel cell module 6B according to another embodiment of the present invention. The fuel cell module 6B shown in FIG. 12B is especially suitable as a power source for use in several kinds of portable equipment. The cell unit array 4A is provided with the fuel fluid feed portion 85 and the oxidizing fluid feed portion 86. The fuel fluid feed portion 85 and the oxidizing fluid feed portion 86 are partitioned by the cell unit array 4A. The fluid-permeable partition member 89, shown in FIG. 12B, is optionally provided if necessary.

In the fuel cell module 6B, the fluid supply source in the fuel fluid feed portion 85 is formed from a hydrogen absorbing alloy 85a, and, for example, hydrogen gas is supplied from the hydrogen absorbing alloy 85a to the cell unit array 4A as a fuel fluid. Absorption and discharge of hydrogen by the hydrogen absorbing alloy 85a can be controlled by, for example, conducting heating and cooling using Peltier elements in combination (see Japanese Unexamined Patent Publication No. 1994-265238). The cell unit array 4A is supported, on the drawing, by a flat and block-like hydrogen absorbing alloy 85a disposed below the cell unit array 4A.

The oxidizing fluid feed portion 86 is located above the cell unit array 4A in the drawing, and, for example, air is introduced from the oxidizing fluid inlet 86a to the oxidizing fluid feed portion 86, and nitrogen gas, excess oxygen gas and water or water vapor are discharged from the outlet 86b. In the fuel cell module 6B, the wall in the upper portion of the oxidizing fluid feed portion 86, i.e., the wall of the cell unit array 4A that faces the oxygen electrode, is an optically transparent window 86c, which is formed of glass or a like optically transparent material, and the oxygen electrode (cathode) of the cell unit is optically transparent.

When hydrogen gas is supplied, as a fuel gas, from the hydrogen absorbing alloy 85a of the fuel fluid feed portion 85, and, for example, air is supplied from the oxidizing fluid inlet 86a of the oxidizing fluid feed portion 86 to the fuel cell module 6B having the above-described construction, the reactions at the fuel electrode and the oxygen electrode are accelerated by the light reaching the interlayer of the cell unit array 4A through the optically transparent window 86c. Accordingly, the reaction shown in Formula (1) proceeds at the fuel electrode, and the reaction shown in Formula (2) proceeds at the oxygen electrode. Electric power is thereby generated in the cell unit array 4A, and then output outside the fuel cell module 6B via the collector (not shown) provided in the fuel electrode and the oxygen electrode.

Figure 13:
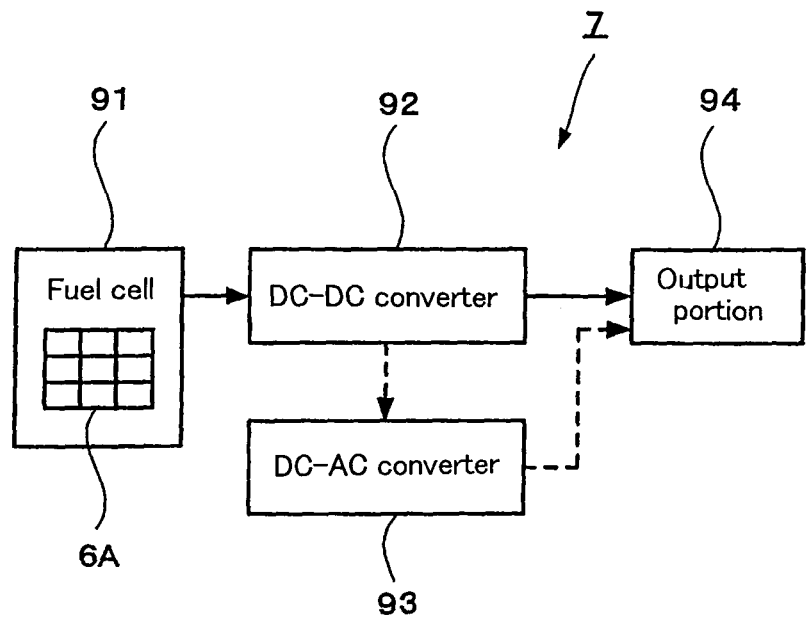
FIG. 13 is a block diagram illustrating a fuel cell system according to one embodiment of the present invention.
Figure 14:
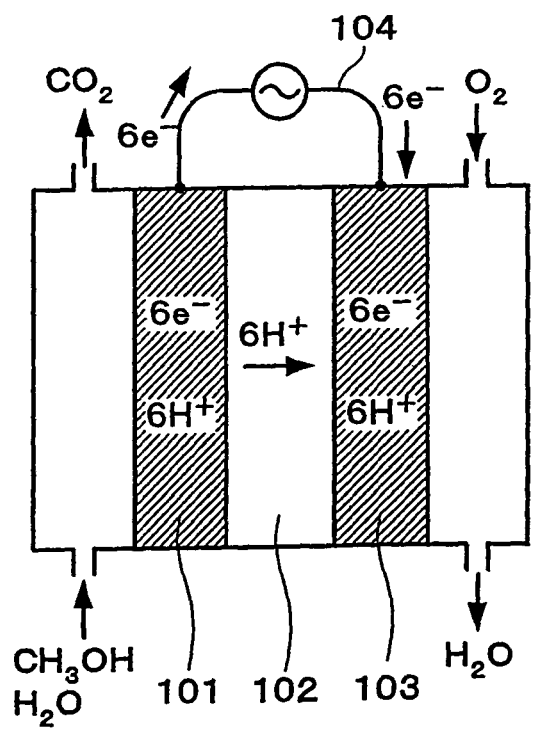
FIG. 14 is an explanatory diagram of the principle of electric power generation in a fuel cell, schematically illustrating the principal structure of the cell unit and electrochemical reaction.

FIG. 13 is a block diagram illustrating a fuel cell system 7 according to one embodiment of the present invention. The fuel cell system 7 comprises a plurality of fuel cell modules 6A (in FIG. 13, an example using the fuel cell module 6A is shown, but the fuel cell module 6B may also be used) unitedly combined, fuel cell 91, to which each fuel cell module 6A is electrically connected, a DC-DC converter 92 electrically connected to the fuel cell 91, a DC-AC converter 93 connected to the output side of the DC-DC converter 92, and an output portion 94. The DC-AC converter 93 may be provided if necessary. When an alternating current is not required as the power source, the DC-DC converter 92 and the output portion 94 are directly connected.

The fuel cell 91 comprises a plurality of fuel cell modules 6A, by which electric power having a predetermined voltage and electric current is output to the DC-DC converter 92.

In the DC-DC converter 92, the voltage of the electric power supplied from the fuel cell 91 is increased to the extent required by the external load (not shown). In this case, the electric current is reduced according to the increase in voltage; therefore, in order to attain the electric current required by the external load, it is necessary to suitably select the output from the fuel cell 91, i.e., the structure of the fuel cell module 6A.

If the external load requires alternating current, the electric power whose voltage is increased in the DC-DC converter 92, is converted into alternating current by the DC-AC converter 93, and then output from the fuel cell system 7 via the output portion 94 as alternating current electric power. When the generated electric power is used as direct current, as described above, direct current electric power is output from the DC-DC converter 92, as the output from the fuel cell system 7, via the output portion 94.

The output voltage of the cell units 1 can be increased by laminating the cell units 1, for example, as shown in FIG. 11. However, if it is difficult to employ a structure featuring lamination of the cell units 1, the output voltage can be easily increased by using the DC-DC converter 92 as in the fuel cell system 7.

The invention claimed is:

1. A fuel cell unit having a PIN structure comprising:
    a fuel electrode formed of a p-type semiconductor, an oxygen electrode formed of an n-type semiconductor, and an interlayer formed of an intrinsic semiconductor arranged between the fuel electrode and the oxygen electrode;
    the fuel electrode being porous and permeable to fuel fluid;
    a metal-based catalyst layer being formed on inner surfaces of pores in the porous portion of the fuel electrode;
    the oxygen electrode being porous and permeable to oxidizing fluid;
    a metal-based catalyst layer being formed on inner surfaces of pores in the porous portion of the oxygen electrode;
    the interlayer being porous and holding electrolyte therein, allowing hydrogen ions generated at the fuel electrode to pass therethrough, but blocking electrons;
    the fuel electrode, the interlayer and the oxygen electrode each have a planar shape and are arranged parallel to each other within the fuel cell; and the fuel cell has an operating structure that permits light to reach the interlayer and irradiate the electrolyte contained in the interlayer, that supplies fuel fluid to a surface of the fuel electrode and that supplies an oxygen-containing oxidizing fluid to a surface of the oxygen electrode; and
    the fuel cell unit comprising a connecting terminal in each of the fuel electrode and the oxygen electrode, the connecting terminals being electrically connected to each electrode.

2. A fuel cell unit according to claim 1, wherein at least one of the fuel electrode and the oxygen electrode is optically transparent.

3. A fuel cell unit according to claim 1, further comprising optical fibers arranged to provide light to the fuel cell and to irradiate the electrolyte in the interlayer.

4. A fuel cell unit array wherein a plurality of fuel cell units of claim 1 are arranged in a flat manner so that they are electrically connected in parallel and/or in series, and electric power generated from the plurality of fuel cell units is collected and then output.

5. A fuel cell module comprising the fuel cell unit array of claim 4, a fuel feed portion and an oxidizing fluid feed portion;
    the fuel cell unit array being disposed between the fuel feed portion and the oxidizing fluid feed portion in such a manner that fluid cannot pass between the fuel feed portion and the oxidizing fluid feed portion;
    the fuel electrode in the fuel cell unit array facing the fuel feed portion, and the oxygen electrode in the fuel cell unit array facing the oxidizing fluid feed portion;
    the fuel feed portion comprising a fuel inlet portion and a fluid discharge portion, and the oxidizing fluid feed portion comprising an oxidizing fluid inlet portion and a fluid and water discharge portion;
    at least one wall of a wall facing the fuel electrode among walls surrounding the fuel feed portion and of a wall facing the oxygen electrode among walls surrounding the oxidizing fluid feed portion being formed of an optically transparent material; and
    the fuel cell module further comprising an output for outputting electric power generated in and collected from the fuel cell unit array.

6. A fuel cell system comprising a plurality of the fuel cell modules of claim 5 combined in a united manner;
    the plurality of fuel cell modules being connected to each other so that electric power output from the output of each fuel cell module is collected; and
    the fuel cell system further comprising a fuel cell output member for outputting collected electric power, and a DC-DC converter that is electrically connected to the fuel cell output member.

7. A fuel cell unit array wherein a plurality of fuel cell units of claim 1 are laminated via the fuel supply means, the oxidizing fluid supply means and a light introduction means; and
    the plurality of fuel cell units are structured so that they are electrically connected in series, and voltage generated therefrom is added together and then output.

* * * * *